(12) United States Patent
Fozunbal et al.

(10) Patent No.: US 8,045,730 B1
(45) Date of Patent: Oct. 25, 2011

(54) METHODS AND SYSTEMS FOR REDUCING ACOUSTIC ECHOES IN COMMUNICATION SYSTEMS

(75) Inventors: Majid Fozunbal, Mountain View, CA (US); Mat C. Hans, Hoffman Estates, IL (US); Ronald W. Schater, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1588 days.

(21) Appl. No.: 11/407,413

(22) Filed: Apr. 20, 2006

(51) Int. Cl.
*H04B 15/00* (2006.01)
*H04R 3/00* (2006.01)
*H04R 27/00* (2006.01)
*H03F 99/00* (2009.01)

(52) U.S. Cl. ............. 381/93; 381/95; 381/96; 381/83; 381/121

(58) Field of Classification Search .............. 381/63, 381/83, 93, 95, 96, 121, 71.1, 71.2, 71.11, 381/71.12; 379/406.01, 406.06, 406.08
See application file for complete search history.

(56) References Cited

U.S. PATENT DOCUMENTS

2002/0159603 A1 * 10/2002 Hirai et al. ............. 381/61
* cited by examiner

*Primary Examiner* — Devona Faulk
*Assistant Examiner* — George Monikang

(57) ABSTRACT

Various embodiments of the present invention are directed to methods and systems that reduce acoustic echoes in audio signals in accordance with changing conditions at first and second locations that are linked together in a communication system. In one embodiment of the present invention, a first digital signal encoding sounds produced at the first location is output from the first location, and a second digital signal encoding an acoustic echo and sounds produced at the second location is output from the second location. The method computes a control state that depends on the signals transmitted between the first and the second locations and computes an approximate acoustic echo based on the control state.

20 Claims, 20 Drawing Sheets

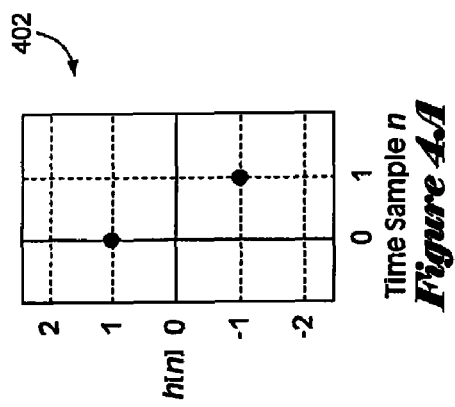
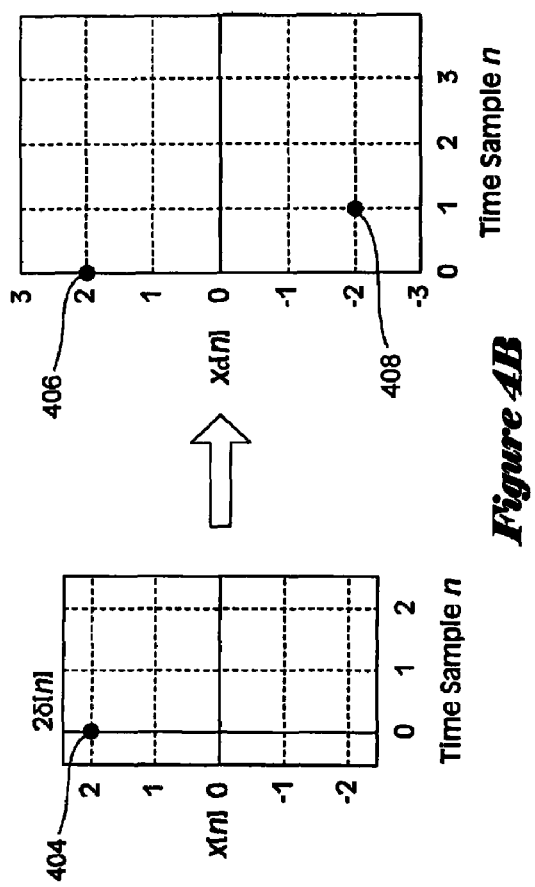
Figure 4A
Figure 4B

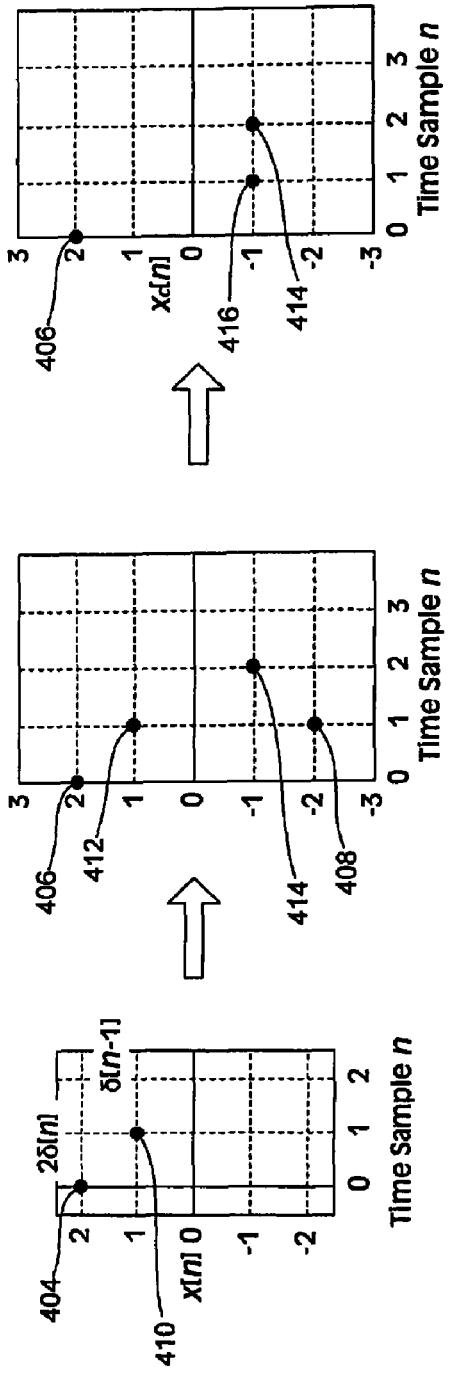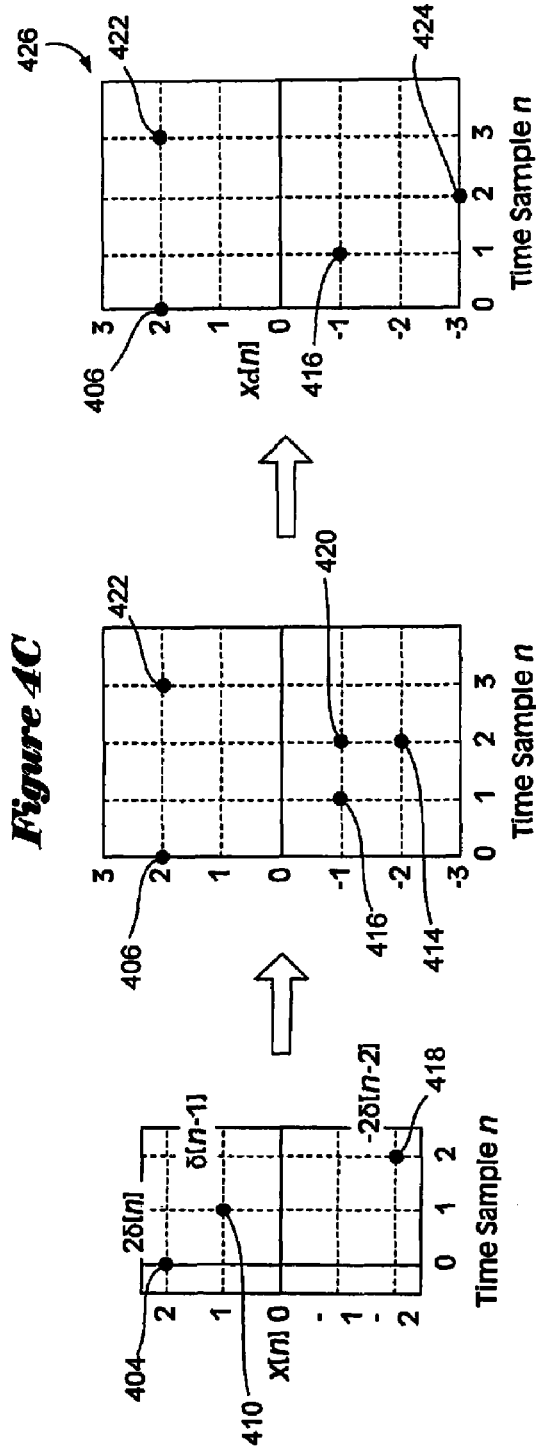
*Figure 4C*
*Figure 4D*

METHODS AND SYSTEMS FOR REDUCING ACOUSTIC ECHOES IN COMMUNICATION SYSTEMS

TECHNICAL FIELD

The present invention is related to acoustic echo cancellation, and, in particular, to methods and systems for reducing acoustic echoes in communication systems.

BACKGROUND OF THE INVENTION

Increasing interest in communication media, such as the Internet, electronic presentations, voice mail, and audio-conference communication systems, is increasing the demand for high-fidelity audio and communication technologies. Currently, individuals and businesses are using these communication media to increase efficiency and productivity, while decreasing cost and complexity. For example, audio-conference communication systems allow one or more individuals at a first location to simultaneously converse with one or more individuals at other locations through full-duplex communication lines in nearly real time, without wearing headsets or using handheld communication devices. Typically, audio-conference communication systems include a number of microphones and loudspeakers, at each location, that can be used by multiple individuals for sending and receiving audio signals to and from other locations.

In many audio-conference communication systems, audio signals carry a large amount of data, and employ a broad range of frequencies. Modern audio-conference communication systems attempt to provide clear transmission of audio signals, free from perceivable distortion, background noise, and other undesired audio artifacts. One common type of undesired audio artifact is an acoustic echo. Acoustic echoes can occur when a transmitted audio signal loops through an audio-conference communication system due to the coupling of microphones and speakers at a location. FIG. 1 shows a schematic diagram of an exemplary, two-location, audio-conference communication system. In FIG. 1, the audio-conference communication system 100 includes a near room 102 and a far room 104. Sounds, such as voices, produced in the near room 102 are detected by a microphone 106, and sounds produced in the far room 104 are detected by a microphone 108. The microphones 106 and 108 are transducers that convert the sounds into continuous analog signals that are represented by x(t) and y(t), respectively, where t is time.

The microphone 106 can detect many different sounds produced in the near room 102, including sounds output by the loudspeaker 114. An analog signal produced by the microphone 106 is represented by:

$$y(t) = s(t) + f(x(t)) + v(t)$$

where s(t) is an analog signal representing sounds produced in the near room 102, v(t) is an analog signal representing noise, or extraneous signals created by disturbances in the microphone or communication channel 110, that, for example, may produces an annoying buzzing sound output from the loudspeaker 116, and f(x(t)) is an analog signal that represents an acoustic echo. The acoustic echo f(x(t)) is due to both acoustic propagation delay in the near room 102 and a round-trip transmission delay of the analog signal x(t) over the communication channels 110 and 112. Sounds generated by the analog signal y(t) are output from loudspeaker 116 in the far room 104. Depending on the amplification, or gain, in the amplitude of the signal y(t) and the magnitude of the acoustic echo f(x(t)), a person speaking into the microphone 108 in the far room 104 may also hear an annoying, high-pitched, howling sound emanating from loudspeaker 116 as a result of the sound generated by the acoustic echo f(x(t)).

Designers and manufacturers of audio-conference communication systems have attempted to compensate for acoustic echoes in various ways. One compensation technique employs a filtering system that reduces the acoustic echo. Typically, filtering systems employ adaptive filters that adapt to changing conditions at an audio-signal-receiving location. However, stand alone adaptive filters either fail to account for, or are often slow to adapt to, the widely varying acoustic path between loudspeaker and microphone. As a result, transmitted signals encoding conversations may be interrupted by numerous, brief periods of silence. Designers, manufacturers, and users of audio-conference communication systems have recognized a need for acoustic echo methods and systems that can reliably remove an acoustic echo from audio signals and that can rapidly adapt to the changing conditions at both audio-signal-receiving locations.

SUMMARY OF THE INVENTION

Various embodiments of the present invention are directed to methods and systems that reduce acoustic echoes in audio signals in accordance with changing conditions at first and second locations that are linked together in a communication system. In one embodiment of the present invention, a first digital signal encoding sounds produced at the first location is output from the first location, and a second digital signal encoding an acoustic echo and sounds produced at the second location is output from the second location. The method computes a control state that depends on the signals transmitted between the first and the second locations and computes an approximate acoustic echo based on the control state.

BRIEF DESCRIPTION OF THE DRAWINGS

FIGS. 4A-4D illustrate an example of determining a digital signal output from a microphone by convolving an input digital signal with the microphone impulse response.

DETAILED DESCRIPTION OF THE INVENTION

Various embodiments of the present invention are directed to methods and systems that reduce acoustic echoes in audio signals in accordance with changing conditions at first and second locations that are linked together in a communication system. The communication system can be the Internet, electronic presentations, voice mail, audio-conference communication systems or any other kind of communication system that transmits signals between a first location and a second location. In various embodiments of the present invention, a first digital signal and a second digital signal are received as input at the first location. The first digital signal encodes sounds produced at a first location. The second digital signal encodes an acoustic echo and sounds produced at the second location. The methods compute a control state that depends on the state of current signal transmission. The control state represents one of the following: (1) sound transmitted from the first location only; (2) sound transmitted from the second location only; (3) sounds transmitted simultaneously between the first and second locations; and (4) no sound transmitted between the first and second locations. The methods then compute an approximate acoustic echo based on the control state. The methods generate an output digital signal at the first location by first subtracting the computed, approximate acoustic echo from the second digital signal, then adjusting the second digital signal for gain based on the control state. Finally, the output digital signal is transmitted to the first location.

In order to assist in understanding descriptions of various embodiments of the present invention, an overview of digital signals, impulse responses, and convolution is provided in a first subsection. An overview of acoustic echo cancellation is provided in a second subsection. An overview of discrete Fourier transformations is provided in a third subsection. Embodiments of the present invention are provided in a fourth subsection.

An Overview of Digital Signals, Impulse Responses, and Convolution

Sounds received by a microphone are transformed into an analog signal comprising a time-dependent, continuously varying voltage. In order to process an analog signal using a digital computer, the analog signal is first converted into a digital signal with minimal alteration of the essential information contained in the analog signal. Digital signals can be stored electronically, magnetically, or optically and can be processed using logical operations encoded in computer programs.

Figure 2A:
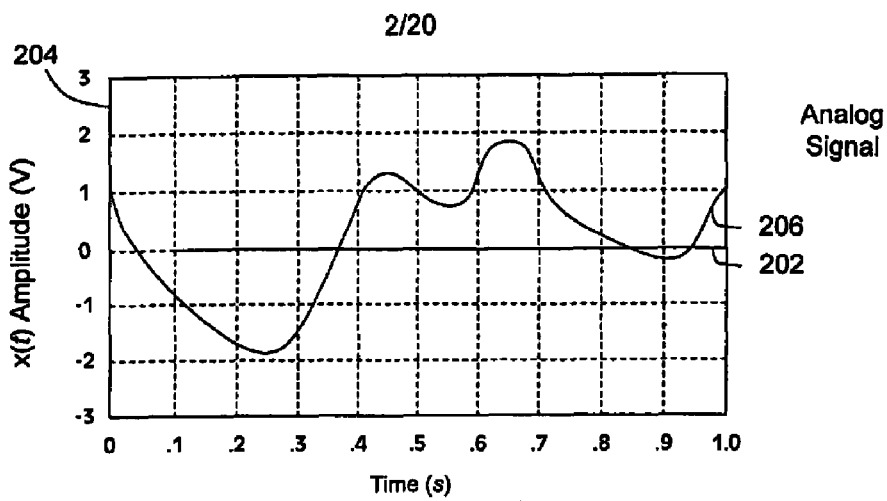
FIGS. 2A-2C illustrate conversion of an analog signal to a digital signal.
Figure 2B:
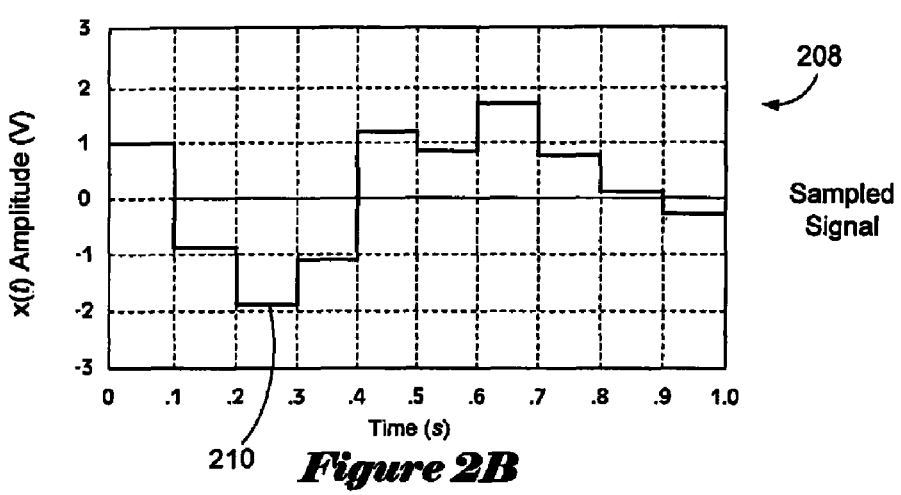
Figure 2C:
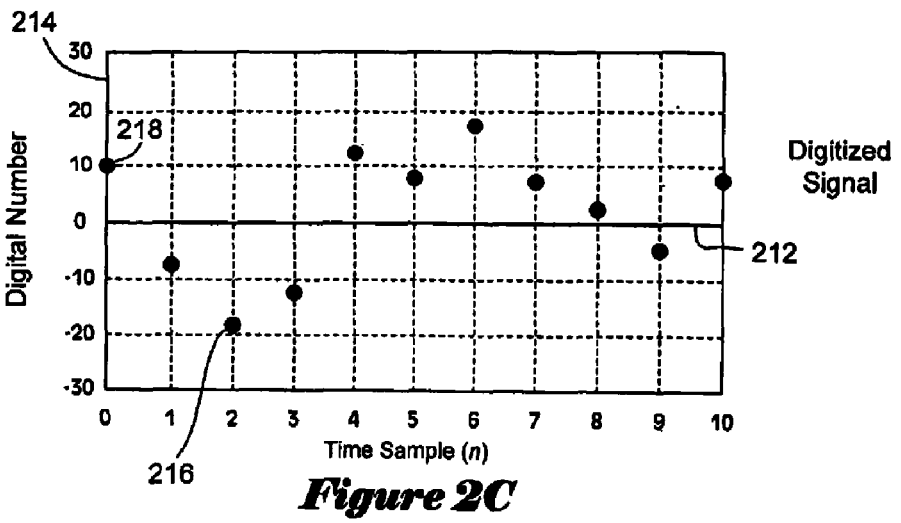

FIGS. 2A-2C illustrate conversion of an analog signal into a digital signal. In FIGS. 2A-2B, horizontal axes, such as horizontal axis 202, represent time, and vertical axes, such as vertical axis 204, represent analog signal amplitudes in volts. FIG. 2A is a plot of a time-dependent, continuously-varying analog signal x(t) 206. The analog signal x(t) 206 is first sampled by measuring the amplitude of the analog signal x(t) at discrete sampling times. In order to prevent loss of essential information contained in the analog signal, the duration between sampling times is generally selected to be sufficiently short so that the analog signal varies little between consecutive sampling times. FIG. 2B is a plot of a sampled signal 208 obtained by sampling the analog signal 206 in FIG. 2A. The sampling times are in tenths of a second, and the sampled signal 208 is approximated as a step function by assuming a constant-signal amplitude between sampling times. For example, a constant-amplitude region 210 represents a constant value of −1.9 volts between sampling times 0.2 and 0.3 seconds.

For efficient and convenient digital signal processing, it is desirable for both time and magnitude values to be integers. Therefore, an integer-encoded, digital signal is produced by multiplying the value of each constant-amplitude region by a selected constant and by multiplying the sampling times by a selected constant in order to produce integer values that represent the amplitude and sampling times of each step in the step function. An integer-valued sampling time is called a "time sample," and an integer-valued amplitude is called a "digital amplitude." The resulting digital signal can be functionally represented by x[n], where n, an independent variable, represents a time sample domain. FIG. 2C is a plot of a digital signal obtained from the sampled signal 208 in FIG. 2B. In FIG. 2C, horizontal axis 212 is a time sample domain, vertical axis 214 is a digital signal axis. Each point in the graph represents a quantized value representing the scaled amplitude of the digital signal at a scaled sampling time. For example, point x[2] 216 with coordinates (2,−19) represents step 210 in FIG. 2B.

A digital signal x[n] can, in general, be thought of as a series of impulses, each impulse corresponding to a unique component. The notation x[n], where n represents a particular time sample, can also be used to represent a single impulse of a digital signal that is called a "component" of a signal. Each component is a signal comprising all zero sample values except for a single value representing the amplitude at a single time sample, and is mathematically represented by:

$$x[n]=d\delta[n-p]$$

where d is an integer scale factor that represents the amplitude, or strength, of the impulse, p is a time sample, and δ is the delta function defined as:

$$\delta[n-p] = \begin{cases} 1 & \text{when } n = p \\ 0 & \text{otherwise} \end{cases}$$

For example, in FIG. 2C, the component x[0] 218 is equal to 10δ[p], and the component x[2] 216 is equal to −19δ[2−p]. In other words, p in the delta function δ[n−] represents a time sample shift, and n−p represents a time sample relative to time sample n.

A digital impulse response, h[n], is a digital signal that is output from a microphone when the input to the microphone is a unit impulse δ[n], where p is "0" and d equals "1." The impulse response of a microphone can be determined by applying an impulse of sound with a very short duration to the microphone and measuring the signal output by the microphone. The impulse response can also be represented by a vector as follows:

$$h[n] = \vec{h}_n = \begin{bmatrix} h_n[0] \\ h_n[1] \\ \vdots \\ h_n[L-1] \end{bmatrix}$$

where $k_n[.]$ is an impulse response component, and

L is the number of components that together compose the impulse response.

Figure 3:
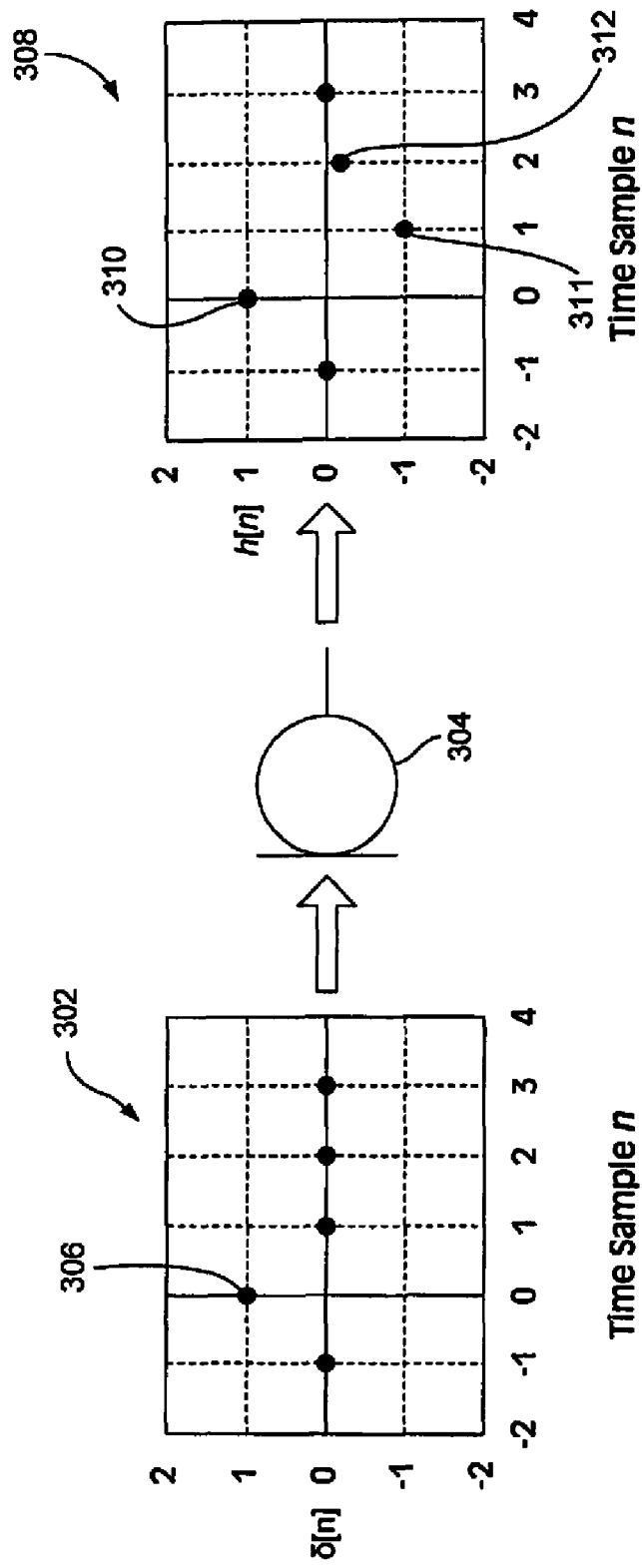
FIG. 3 is a plot of an impulse input to a microphone and a plot of an impulse response produced by the microphone in response to the input impulse.

FIG. 3 shows a plot of an impulse x[n] and a plot of an impulse response h[n] produced in response to the impulse x[n]. In FIG. 3, impulse plot 302 represents an impulse x[n] input to a hypothetical microphone 304. The impulse x[n] 302 comprises all zeros except for a single nonzero point 306 at n equal to 0 and is represented by dδ[n−p] as described above. In this case, d equals "1" and p equals "0" so the impulse can be represented as δ[n]. In response to the impulse 302, the microphone 304 outputs an impulse response h[n] that is represented by an impulse-response plot 308. The impulse response 308 comprises all zeros except for the three nonzero digital signals represented by points 310-312. An actual digital impulse response to an impulse typically comprises a greater number of nonzero components than contained in the impulse, as shown in FIG. 3. For example, the impulse response 308 includes 3 nonzero components while impulse 302 includes a single nonzero component. Impulse response 308 can be represented by the 3-component vector:

$$h[0] = \vec{h}_0 = \begin{bmatrix} h_0[0] \\ h_0[1] \\ h_0[2] \end{bmatrix} = \begin{bmatrix} 1.5 \\ -1 \\ -.25 \end{bmatrix}$$

Typically, the impulse used to determine an impulse response is output from a loudspeaker into a room and is detected by a microphone. The loudspeaker, room, and microphone are referred to as a "system," and an associated impulse response can be thought of as a system impulse response. A digital signal transmitted from the system is determined by convolving a digital signal x[n] produced by the system with the impulse response h[n] of the system. The convolved digital signal is represented by $x_c[n]$. FIGS. 4A-4D provide a graphical example of convolving a three-component digital signal x[n] produced by a hypothetical system with an impulse response h[n] in order to produce a digital signal $x_c[n]$ output from the system. FIG. 4A is a plot of an example, two-component, impulse response h[n] 402 that is produced by the hypothetical system. The impulse response h[n] is assumed to be invariant with time.

FIG. 4B is a plot of a first component of the digital signal x[n] that is input to the system at a time sample "0." The first component is represented by a scaled impulse 2δ[0] 404. In response to the impulse 2δ[n] 404, the system outputs an impulse-response h[n] comprising a first component 406 at the time sample "0," and outputs a second component 408 at a later time sample "1." The impulse response to the impulse 2δ[n] 404 is essentially the impulse response in FIG. 4A with the components multiplied by the impulse scale factor "2."

FIG. 4C is a plot of a second component of the digital signal x[n] that is input to the system at the later time sample "1." The second component is represented by an impulse δ[n−1] 410. In response to the impulse δ[n−1] 410, the system outputs an impulse-response comprising a third component 412 at the time sample "1," and outputs a fourth component 414 at a later time sample "2." The impulse response to the impulse δ[n−1] 410 is essentially the impulse response in FIG. 4A with the component time samples shifted by a factor of "1." Because the second and the third components 408 and 412 occur at the same time sample "1," the amplitudes of the components 408 and 412 are summed in order to obtain a fifth component 416, which is the output at the time sample "1."

FIG. 4D is a plot of a third component of the digital signal x[n] that is input to the system at the time sample "2." The second component is represented by an impulse −2δ[n−2] 418. In response to the impulse −2δ[n−2], the system outputs an impulse response comprising a sixth component 420 at the time sample "2," and a seventh component 422 at a later time sample "3." The impulse response to the impulse −2δ[n−2] 418 is essentially the impulse response in FIG. 4A with the components multiplied by the scale factor "−2," and the component time samples shifted by a factor of "2." Because the fifth and the sixth components 414 and 420 occur at the same time sample "2," the amplitudes of the component 414 and 420 are summed to give an eighth component 424, which is the output at the time sample "2."

Note that convolving the three-component, input digital signal x[n] with the two-component impulse response h[n] outputs the four-component digital signal [n]. In general, convolving an N component input digital signal x[n] with an L component impulse response h[n] gives an N+L−1 component output signal $x_c[n]$.

Components of the convolved digital signal $x_c[n]$ 426, in FIG. 4D, can also be obtained by calculating the scalar product of a two-component vector representation of the impulse response and two-component vectors corresponding to each component of the digital signal x[n] that are given by:

$$\vec{h} = \begin{bmatrix} h[0] \\ h[1] \end{bmatrix} = \begin{bmatrix} 1 \\ -1 \end{bmatrix}, \text{ and } \vec{x}[n] = \begin{bmatrix} x[n] \\ x[n-1] \end{bmatrix}.$$

The order of the components in the column vectors $\vec{h}$ and $\vec{x}[n]$ are opposite in time ordering with respect to one another. For example, in the column vector $\vec{h}$, the first component h[0] appears earlier in time than the second component h[1], while, in the column vector $\vec{x}[n]$, the first component x[n] appears later in time than the second component x[n−1]. Note that components of the vector $\vec{x}[n]$ that correspond to negative valued time samples are assigned the value "0." For example, the first component 406, in FIG. 4D, is calculated by:

$$x_c[0] = [h[0], h[1]]^T \begin{bmatrix} x[0] \\ x[-1] \end{bmatrix} = [1, -1]^T \begin{bmatrix} 2 \\ 0 \end{bmatrix} = 2$$

where the component x[−1] is assigned the value "0." The second, third, and fourth components 416, 424, and 422 are calculated by:

$$x_c[1] = [h[0], h[1]]^T \begin{bmatrix} x[1] \\ x[0] \end{bmatrix} = [1, -1]^T \begin{bmatrix} 1 \\ 2 \end{bmatrix} = -1,$$

$$x_c[2] = [h[0], h[1]]^T \begin{bmatrix} x[2] \\ x[1] \end{bmatrix} = [1, -1]^T \begin{bmatrix} -2 \\ 1 \end{bmatrix} = -3, \text{ and}$$

$$x_c[3] = [h[0], h[1]]^T \begin{bmatrix} x[3] \\ x[2] \end{bmatrix} = [1, -1]^T \begin{bmatrix} 0 \\ -2 \end{bmatrix} = 2,$$

respectively.

In general, a component of a convolved digital signal $x_c[n]$ is mathematically determined by:

$$x_c[n] = x[n] * h[n]$$
$$= \vec{h}_n \cdot \vec{x}[n]$$
$$= \sum_{i=0}^{L-1} h_n[i]x[n-i]$$

where

"*" is a symbol that represents convolution, and $$\vec{x}[n] = \begin{bmatrix} x[n] \\ x[n-1] \\ \vdots \\ x[n-(L-1)] \end{bmatrix}.$$

In order to compute a convolved signal component $x_c[n]$, the L previously obtain digital signal components of the digital signal x[n] are used, and the components of the vector $\vec{x}[n]$ that correspond to negative valued time samples are assigned the value "0."

Figure 5:
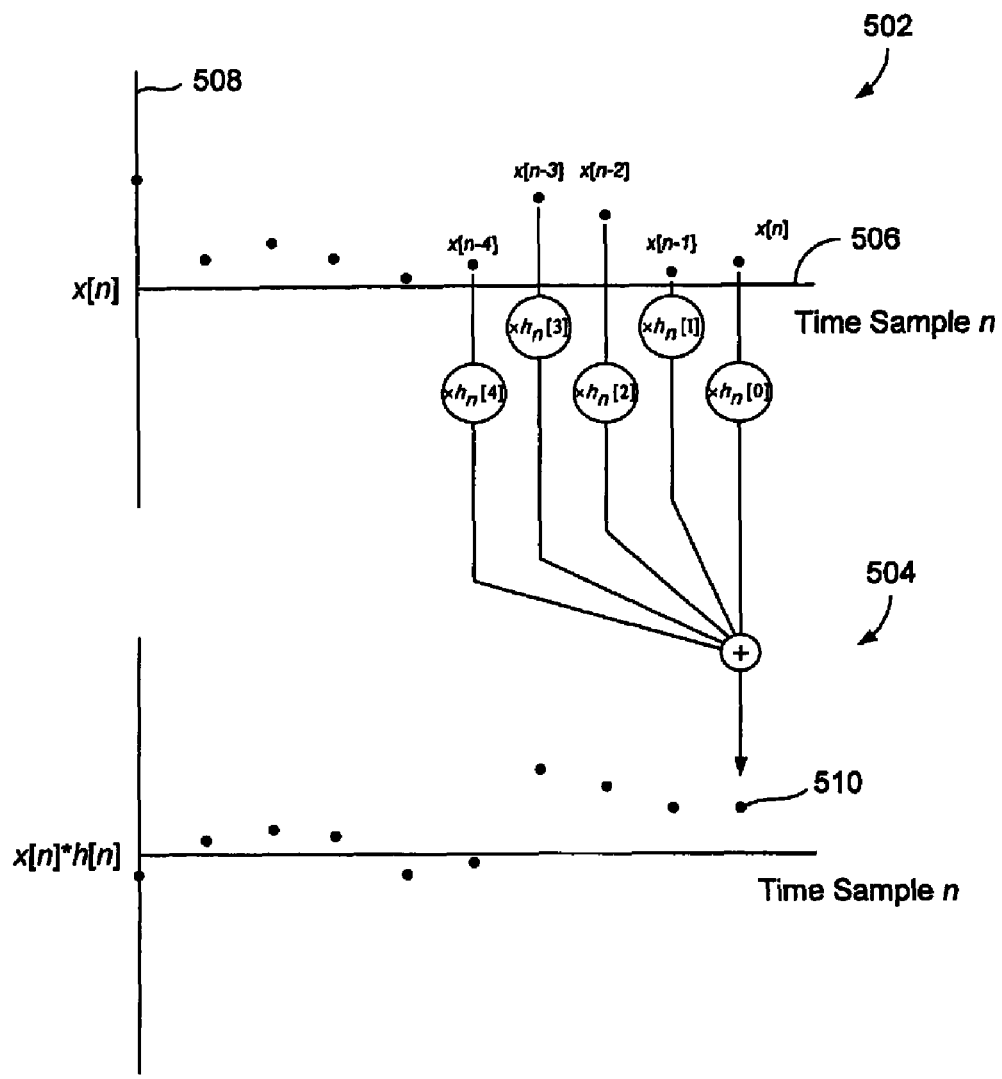
FIG. 5 illustrates convolving a digital signal with a five-component impulse response in order to obtain a convolved digital signal.

FIG. 5 illustrates convolving a digital signal displayed in plot 502 with a five-component impulse response in order to obtain a convolved digital signal displayed in plot 504. In plots 502 and 504, horizontal axes, such as horizontal axis 506, are time sample axes, and vertical axes, such as vertical axis 508, are digital number axes. The convolved digital signal sample 510 in plot 504 is obtained as shown in FIG. 5 and is mathematically represented by:

$$x_c[n] = x[n] * h[n]$$
$$= [h_n[0] \ h_n[1] \ h_n[2] \ h_n[3] \ h_n[4]]^T \begin{bmatrix} x[n] \\ x[n-1] \\ x[n-2] \\ x[n-3] \\ x[n-4] \end{bmatrix}$$
$$= \sum_{i=0}^{4} h_n[i]x[n-i]$$

where superscript T identifies the matrix transpose operation.

In the examples of convolution described above, the impulse response is assumed to remain constant at each time sample in the time domain. However, in practice, the impulse response of a system often depends on the conditions of the room. In other words, the impulse response of the system may change over time as conditions in the room change. For example, an impulse response of a system with no sound produced in the room is different from an impulse response of the same system at a later time when sounds are produced in the room.

An Overview of Acoustic Echo Cancellation

Figure 1:
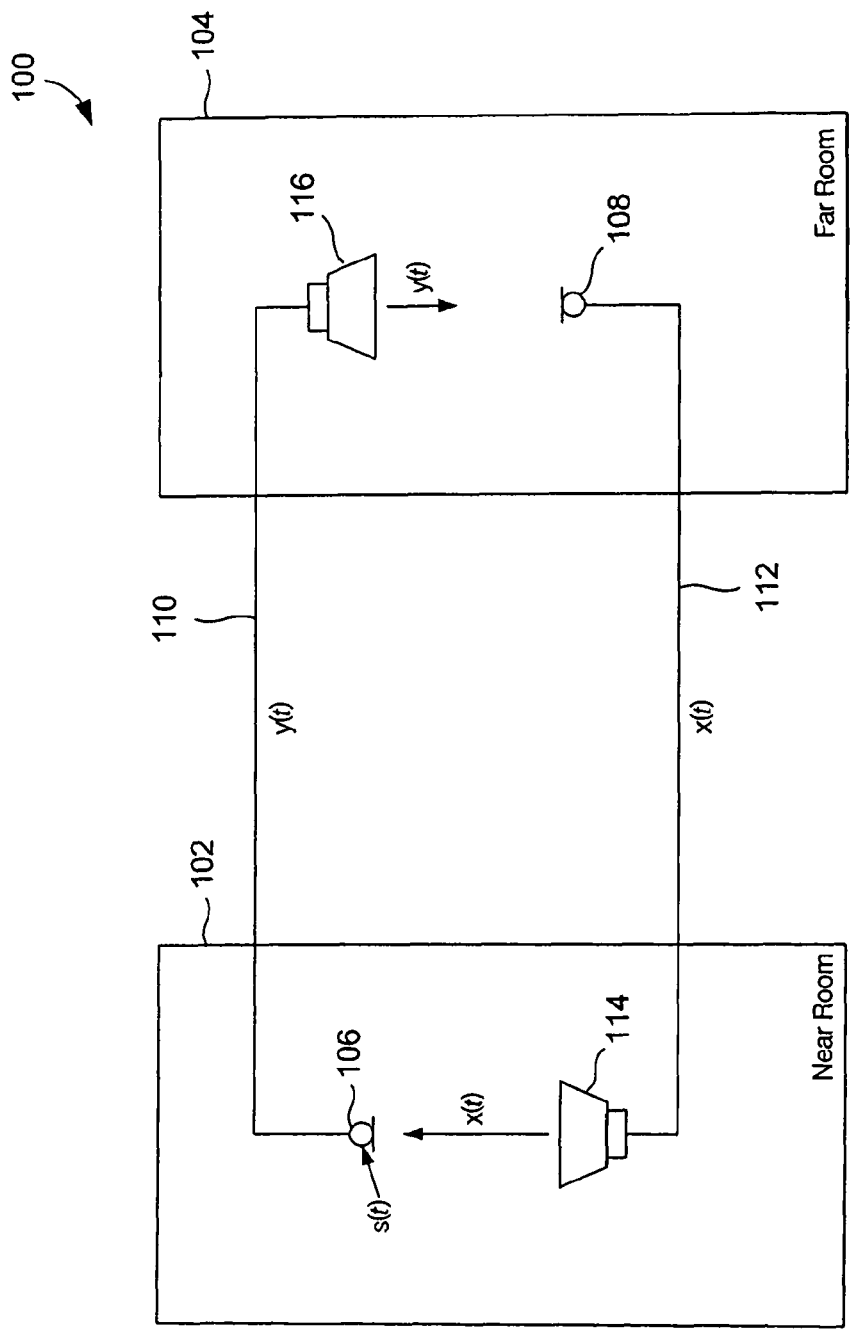
FIG. 1 shows a schematic diagram of an exemplary, two-location, audio-conference communication system.
Figure 6:
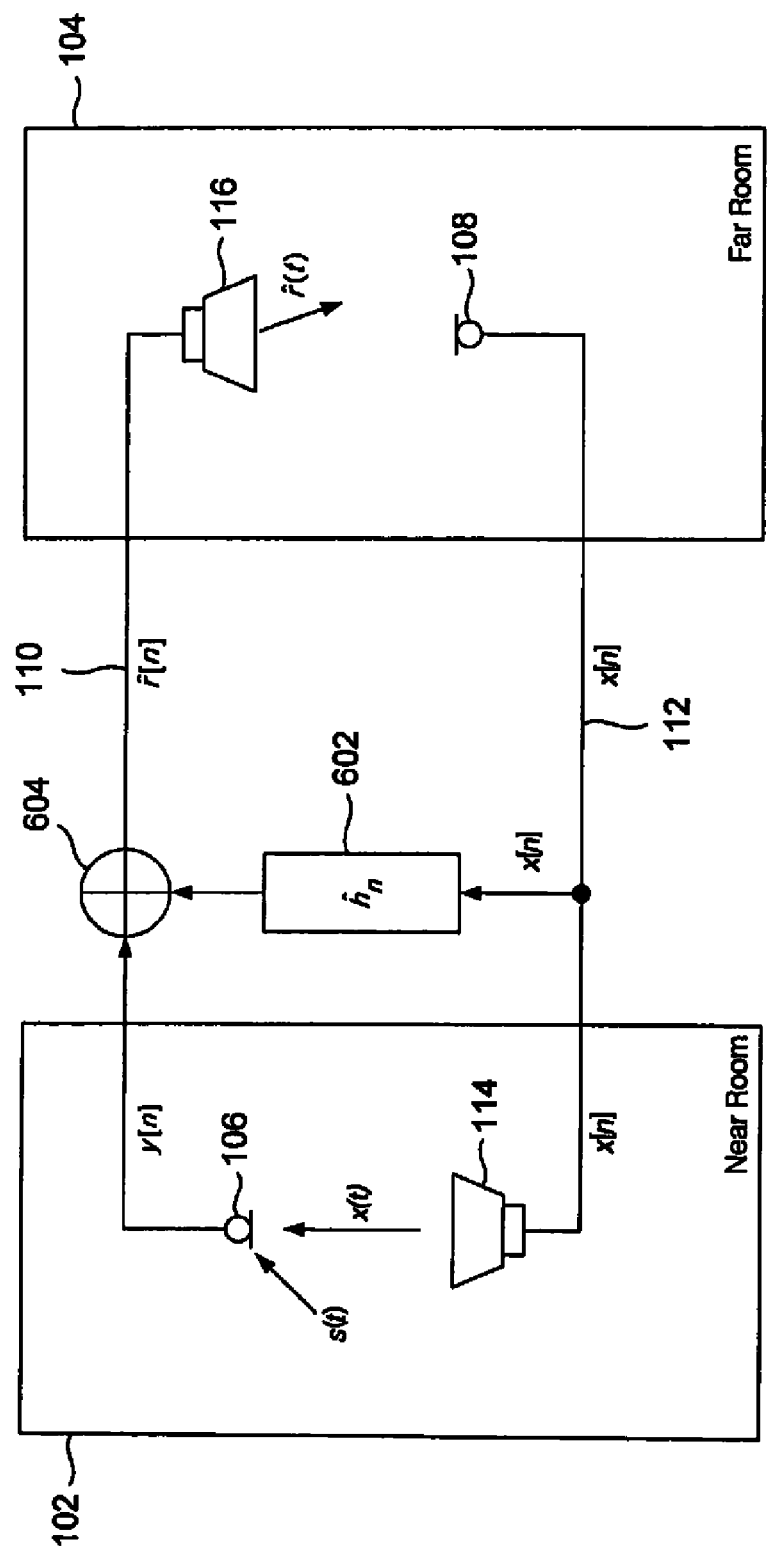
FIG. 6 shows a schematic diagram of an exemplary, two-location, audio-conference communication system that includes an adaptive filter to reduce the level of the acoustic echo.

FIG. 6 shows a schematic diagram of the exemplary, two-location, audio-conference communication system shown in FIG. 1 that includes an adaptive filter 602 to reduce the level of an acoustic echo. In FIG. 6, the digital signal x[n] is transmitted in the communication channel 112 from the far room 104 to the loudspeaker 114 in the near room 102. When the digital signal x[n] reaches the loudspeaker 114, the digital signal x[n] can be converted back into an analog signal x(t) and sound is output from the loudspeaker 114. The microphone 106 detects the sound output from the loudspeaker 114 and any sounds produced in the near room 102. The microphone outputs a digital signal in the communication channel 110 to the far room 104 that is mathematically represented by:

$$y[n]=s[n]+x_c[n]+v[n]$$

where $x_c[n]=x[n]*h[n]$ is a convolved digital signal that represents an acoustic echo and is produced by convolving the digital signal x[n] with the impulse response h[n] of the microphone 106, s[n] is a digital signal that represents sounds produced in the near room 102, and v[n] is a digital signal that represents any noise produced by electrical disturbances in both the microphone 106 and the communications channel 110.

In practice, the impulse response h[n] of the microphone 106 is not known with certainty. In order to reduce the amount of the acoustic echo x[n] present in the digital signal y[n], an approximate acoustic echo is subtracted from the digital signal y[n]. The approximate acoustic echo is produced by also transmitting the digital signal x[n] to an adaptive filter 602, which produces an approximate impulse response, $\hat{h}[n]$. The adaptive filter 602 convolves the approximate impulse response $\hat{h}[n]$ with the digital signal x[n], in order to produce the approximate acoustic echo $x[n]*\hat{h}[n]$, which is subtracted from the digital signal y[n] at the summing junction 604. Subtracting the approximate acoustic echo $x[n]*\hat{h}[n]$ at the summing junction 604 gives an output digital signal that is mathematically represented by:

$$\hat{r}[n] = y[n] - x[n] * \hat{h}[n]$$
$$= s[n] + (x[n] * h[n] - x[n] * \hat{h}[n]) + v[n]$$
$$\cong s[n] + v[n]$$

where $x[n]*h[n]-x[n]*\hat{h}[n]$ is called the "residual echo." The residual echo is a portion of the digital signal y[n] that is transmitted to the far room 104. Acoustic echo cancellation methods and systems are directed to producing approximate acoustic echoes that make the residual echoes inaudible to individuals that are simultaneously producing sounds input to the microphone 108 and listening to the loudspeaker 116 in the far room 104. The adaptive filter 602 is used to reduce the acoustic echo transmitted from the near room 102 to the far room 104. However, in practice, a second adaptive filter is needed to reduce an acoustic echo transmitted from the far room 104 to the near room 102.

An Overview of Discrete Fourier Transforms

Convolving a digital signal x[n] with an impulse response h[n] is often a computationally time-consuming step in the determination of an output digital signal r̂[n]. However, the computational time devoted to convolution can often be reduced by first separately mapping the digital signals x[n] and h[n] to discrete frequency domain digital signals X[k] and H[k], respectively, using a discrete Fourier transform ("DFT"). The DFT is given by:

$$X[k] = \frac{1}{L}\sum_{n=0}^{L-1} x[n]\exp\left(\frac{-j2\pi kn}{L}\right)$$

where k is an inverse time sample index with the units of inverse time or frequency, and $$j=\sqrt{-1}.$$

Next, the digital signals X[k] and H[k] are multiplied in the frequency domain and an inverse discrete Fourier transformation ("IDFT") is applied to the product X[k]H[k], in order to obtain the convolved digital signal x[n]*h[n]. The IDFT applied to the product X[k]H[k] is:

$$x[n]*h[n] = \sum_{k=0}^{N-1} X[k]H[k]\exp\left(\frac{j2\pi kn}{N}\right)$$

where N is the number of digital signals in the inverse time sample domain.

Figure 7:
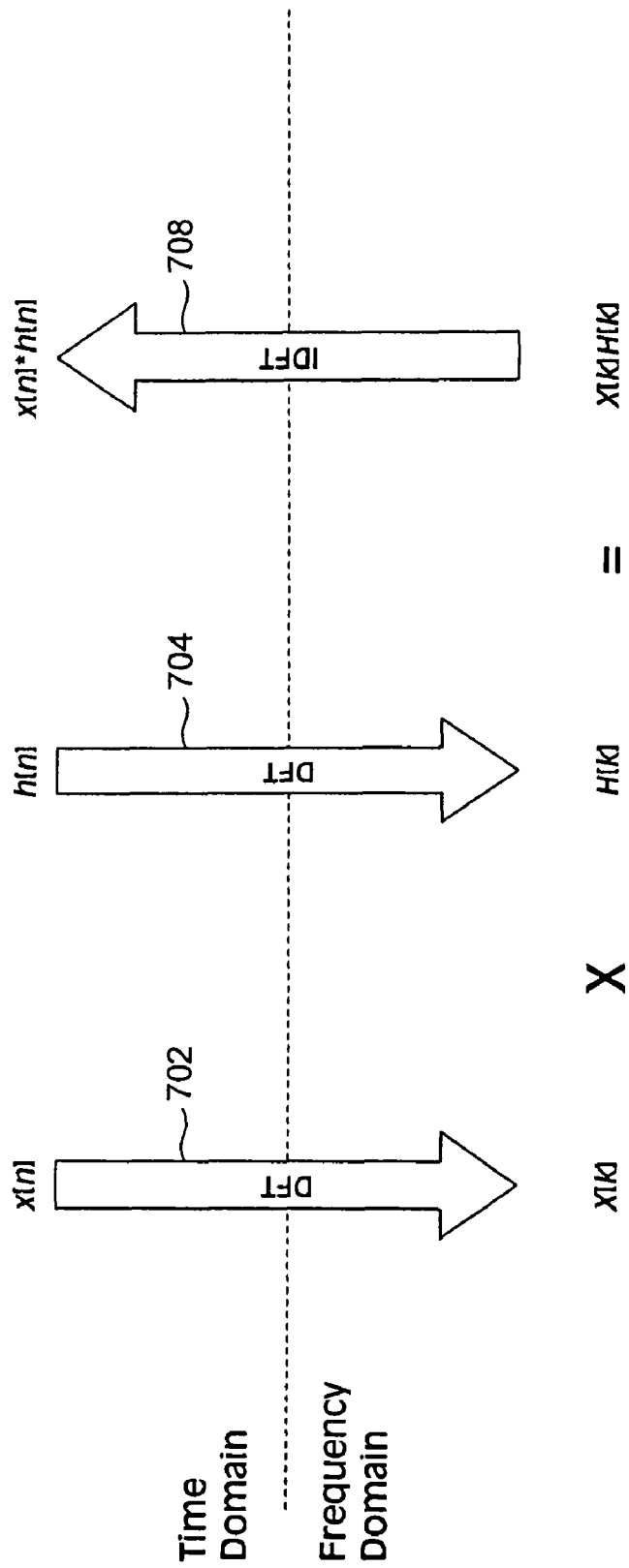
FIG. 7 illustrates convolving a digital signal with an impulse response in a frequency domain in order to obtain a time-domain, convolved digital signal.

FIG. 7 illustrates convolution of the digital signals x[n] and h[n] by first mapping the digital signals x[n] and h[n] to the frequency domain and mapping the product X[k]H[k] back to the time sample domain in order to obtain convolved digital signal x[n]*h[n]. In FIG. 7, directional arrow 702 represents applying a discrete Fourier transform ("DFT") to the digital signal x[n] in order to obtain a digital signal X[k], and directional arrow 704 represents applying the DFT to the impulse response h[n] in order to obtain a digital signal H[k]. The digital signals X[k] and H[k] are multiplied in the frequency domain in order to obtain the product X[k]H[k]. Next, an IDFT 706 is applied the product X[k]H[k] in order to obtain the convolved digital signal x[n]*h[n].

A fast Fourier transformation ("FFT") and a corresponding inverse fast Fourier transform ("IFFT") are types of Fourier transformations that are often employed in order to avoid carrying out convolution in the time sample domain. Using the FFT and the IFFT can be hundreds or even thousands of times faster than convolving digital signals in the time domain. A number of different FFT and IFFT methods are described in the book "Discrete-Time Signal Processing (2$^{nd}$ Edition)," by A. Oppenhiemer, R. Schafer, and J. Buck, Prentice Hall, Inc., (1999-2000), which is just one of many references for the field of digital signal processing. Additional details can be obtained from the above-referenced book, or from many other textbooks, papers, and journal articles in this field.

Embodiments of the Present Invention

Various embodiments of the present invention are directed to methods and systems that reduce acoustic echoes in audio signals and in accordance with changing conditions are separate locations linked by an audio-conference communication systems. Various embodiments are mathematical in nature. For this reason, the present invention is described below with reference to numerous equations, and with reference to graphical illustrations and control-flow diagrams.

I. An Overview of Mathematical Foundations that relate to Embodiments of the Present Invention The various embodiments of the present invention are based on a decision-making framework comprising Markov decision processes, sequential optimization, and optimal control theory. Two references for these fields are the books "Markov Decision Processes: Discrete Stochastic Dynamic Programming," M. L. Puterman, John Wiley and Sons, New York, 1994; and "Dynamic Programming and Optimal Control," D. P. Bertsekas, Athena Scientific vol. I and II, Belmont, Mass., 1995. The description below presents those elements of Markov decision processes and the elements of optimal control theory that relate to embodiments of the present invention. Additional details can be obtained from the above-referenced books, or from many other books, papers, and journal articles in these fields.

As described above with reference to FIG. 3, an impulse response h[n] of a microphone can be mathematically represented as an L-component vector $\bar{h}_n$. A property of the impulse response is that:

$$\bar{h}_n \epsilon T \subseteq \mathbb{R}^L$$

where $\mathbb{R}^L$ is an L-dimensional vector space,

T is a set centered at the origin in $\mathbb{R}^L$ with a radius of $\sqrt{E}$, and E represents the amplification energy, or gain, produced by a microphone in response to an impulse.

In other words, the Euclidean norm of each impulse response output from a microphone satisfies the condition:

$$\|\bar{h}_n\| = \sqrt{\sum_{i=0}^{L-1}(h_n[i])^2} < 2\sqrt{E}$$

Although, in practice, an impulse response $\bar{h}_n$ is not known with certainty during acoustic echo cancellation, methods of the present invention are based on obtaining an approximate impulse response $\hat{h}_n$ that minimizes the average error:

$$J_{h_n}(\hat{h}) = \int (y[n] - \hat{h}_n \cdot \bar{x}[n])^2 dP_{h_n}$$

where $(y[n] - \hat{h}_n \cdot \bar{x}[n])$ is the error between the digital signal y[n] and the acoustic echo $\bar{h}_n^T \cdot \bar{x}[n]$, and $P_{h_n}$ is a joint probability distribution function associated with the error $(y[n] - \hat{h}_n \cdot \bar{x}[n])^2$. The average error $J_{h_n}(\hat{h})$ can also be thought of as an expectation value of a random variable $(y[n] - \hat{h}_n \cdot \bar{x}[n])^2$ with an associated probability $P_{h_n}$.

The method of the present invention produces approximate impulse responses $\hat{h}_n$ that minimize the average error $J_{h_n}(\hat{h}_n)$ and satisfy the following condition:

$$\left\|\bar{h}_n - \hat{\hat{h}}_n\right\| = \inf\left\{\left\|\bar{h}_n - \hat{h}_n\right\| : \hat{h}_n \in \mathcal{H}_{\varepsilon_n}(\hat{\hat{h}}_n)\right\}$$

where $$\left\|\bar{h}_n - \hat{\hat{h}}_n\right\| = \sqrt{\sum_{i=1}^{L}(h_n[i] - \hat{h}_n[i])^2}, \text{ and}$$

$$\mathcal{H}_{\varepsilon_n}(\hat{\hat{h}}_n) = \left\{\hat{\hat{h}}_n \in \mathcal{U} : J_{h_n}(\hat{\hat{h}}) < \sigma_z^2(n) + \varepsilon_n \sigma_x^2(n) E\right\}.$$

In the set $H_{\epsilon_n}(\hat{\bar{h}}_n)$, U is a set centered at the origin in $\mathbb{R}^L$ with a radius of $\sqrt{E}$, $\epsilon_n$ is a subjectively small positive real number, $$\sigma_z^2(n) = \inf_{h_n \in \mathcal{U}} J_{h_n}(\hat{\bar{h}}),$$

and $\sigma_x^2(n) = \int \|\bar{x}[n]\|^2 dP_{h_n}$ is the variance of the digital signal vector $\bar{n}[n]$. The symbol "inf" means the "infimum," which is the maximum lower bound of a set. For example, the infimum of the open interval (0,1) is the number "0" and is represented by inf(0,1)=0 even though the number "0" is not an element of the open interval (0,1).

II. A Stochastic Approximation of the Approximate Impulse Response $\hat{\bar{h}}_n$ The method of the present invention is also based on the assumption that an impulse response $\bar{h}_n$ exhibits little variation over $N_c$ time samples, and the maximum deviation between $N_c$ time samples is bounded by:

$$\|\bar{h}_n - \bar{h}_{n+N_c}\| \leq 2\sqrt{E}$$

As a result, rather than determine an approximate impulse response $\hat{\bar{h}}_n$ for each time sample n, an approximate impulse response, $\hat{\bar{h}}_n$, is determined at the beginning of every $N_d$ time samples, where $N_d \ll N_c$, and m is a positive integer. An interval with $N_d$ time samples is called a "decision period," and the beginning of a decision period is called a "decision epoch."

Figure 8:
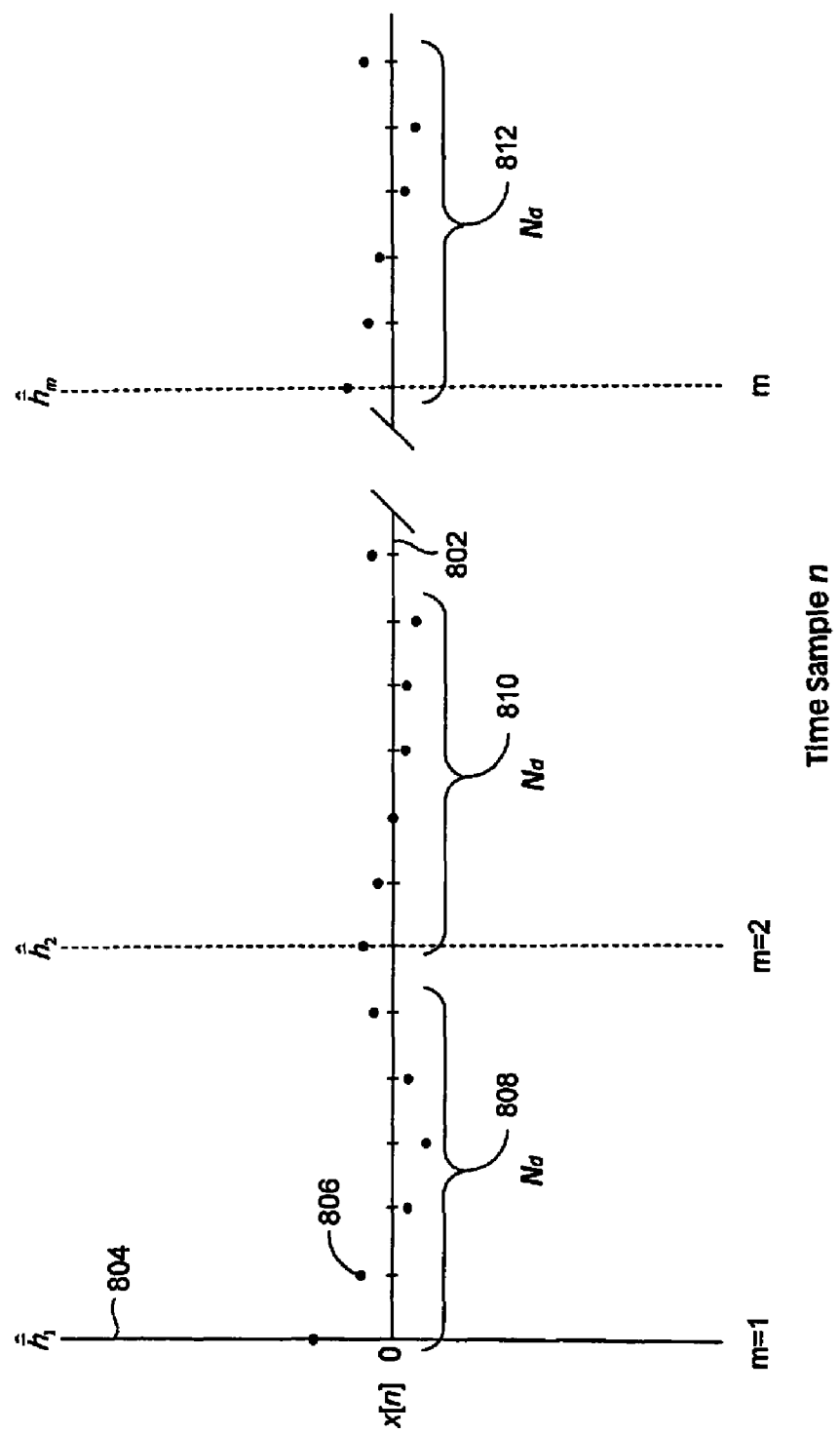
FIG. 8 is an example plot of decision periods and decision epochs that represents one of many embodiments of the present invention.

FIG. 8 is an example plot of decision periods and decision epochs associated with approximate impulse responses that represents one of many embodiments of the present invention. In FIG. 8, horizontal axis 802 is a time sample axis, vertical axis 804 is digital number axis, and dots, such as dot 806, represent a digital signal x[n]. Decision periods 808, 810, and 812 are each comprised of six time samples ($N_d=6$). Decision epochs occur at the beginning of the decision periods 808, 810, and 812. Embodiments of the present invention described below produce a new approximate impulse response $\hat{\bar{h}}_m$ at each decision epoch. For example, at the beginning of the decision period 808, an initial approximate impulse response $\hat{\bar{h}}_1$ is provided. At the beginning of the decision period 810, a new approximate impulse response $\hat{\bar{h}}_2$ is computed. In general, at the beginning of a decision period (m-1)$N_d$ 812, an approximate impulse response $\hat{\bar{h}}_m$ is computed and is used for each time sample n in the interval $[(m-1)N_d, mN_d-1]$.

In practice, the average error $J_{h_n}(\hat{\bar{h}})$ cannot be computed directly, because the joint probability distribution function $P_{h_n}$ associated with each impulse response $\bar{h}_n$ is unknown. However, the average error $J_{h_n}(\hat{\bar{h}})$ can be approximated by an empirical average error:

$$J_{h_n}(\hat{\bar{h}}) \approx J^{(m)}(\hat{\bar{h}}) = \frac{1}{N_d(m-m_0)} \sum_{i=m_0+1}^{m} \left\| \bar{Y}_i - \bar{X}_i \hat{\bar{h}} \right\|^2$$

where
$m_0$ is any decision epoch,
$m > m_0$, and
the superscript (m) also identifies the decision epoch.

An approximate impulse response $\hat{\bar{h}}_m$ is determined by minimizing the empirical average error $J^{(m)}(\hat{\bar{h}})$ over the set U to give a minimum empirical equation:

$$\hat{\bar{h}}_m = \left( \hat{\bar{R}}_{XX}^{(m)} + \lambda_m \bar{I} \right)^{-1} \hat{\bar{R}}_{XY}^{(m)}$$

where the overbar identifies a matrix, $$\hat{\bar{R}}_{XX}^{(m)} = \frac{1}{N_d(m-m_0)} \sum_{i=m_0+1}^{m} \bar{X}_i^T \bar{X}_i,$$

$$\hat{\bar{R}}_{XY}^{(m)} = \frac{1}{N_d(m-m_0)} \sum_{i=m_0+1}^{m} \bar{X}_i^T \bar{Y}_i,$$

$\bar{I}$ is an m by m identity matrix, $$\bar{X}_i = \begin{bmatrix} x[iN_d-1] & \cdots & x[iN_d-L] \\ x[iN_d-2] & \cdots & x[iN_d-L-1] \\ \vdots & \ddots & \vdots \\ x[(i-1)N_d] & \cdots & x[(i-1)N_d-L+1] \end{bmatrix}, \text{ and}$$

$$\bar{Y}^T = [x[iN_d-1] \; x[iN_d-2] \; \ldots \; x[(i-1)N_d]]^T.$$

The constant $\lambda_m$ in the minimum empirical equation is the smallest positive value that ensures $\hat{\bar{h}}_m$ is an element of the set U. However, using the minimum empirical equation to determine the approximate impulse response $\hat{\bar{h}}_m$ is computationally demanding. The computational demand can be reduced by applying a stochastic approximation that gives a recursive equation:

$$\hat{\bar{h}}_m = \hat{\bar{h}}_{m-1} + \gamma_m \bar{Q}_m [\bar{X}'_m (\bar{Y}_m - \bar{X}_m \hat{\bar{h}}_{m-1})] \quad \text{Equation (2)}$$

where
$\bar{Q}_m$ is a matrix with elements determined as described below with reference to a control-flow diagram shown in FIGS. 14, and
$\gamma_m$ is a scalar quantity and is determined as described below with reference to a control-flow diagram shown in FIG. 16.

The methods and systems of the present invention employ the recursive equation to determine the approximate impulse response $\hat{\bar{h}}_m$, which also satisfies the following condition:

$$\hat{\bar{h}}_m \in H_{\delta_m}^{(m)}$$

where $$\mathcal{H}_{\delta_m}^{(m)} = \left\{ \hat{\bar{h}}_m \in \mathcal{U} : J^{(m)}(\hat{\bar{h}}) < v^{(m)} + \delta_m \sigma_x^2(m) E \right\}$$

$$v^{(m)} = \inf_{\hat{\bar{h}}_m \in \mathcal{U}} J^{(m)}(\hat{\bar{h}}_m), \text{ and}$$

$\delta_m$ is a subjectively small positive real number.

III. Implementation

Figure 9:
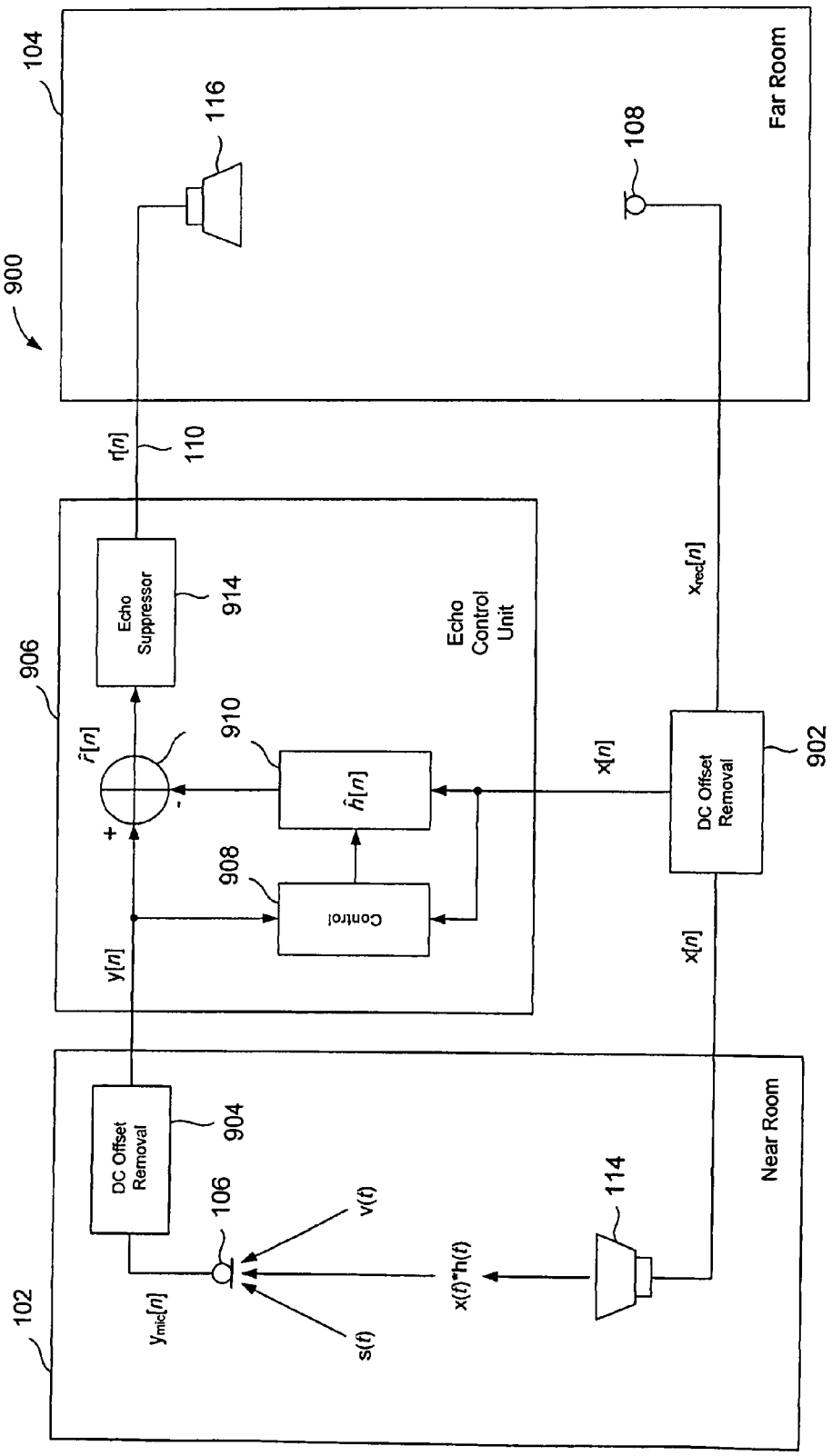
FIG. 9 illustrates a two-location, audio-conference communication system that represents one of many embodiments of the present invention.

FIG. 9 illustrates a two-location, audio-conference communication system, as shown in FIG. 1, including an echo-control unit that represents one of many embodiments of the present invention. The system 900 includes DC offset removal units 902 and 904 and an echo-control unit 906. DC offset is a low-frequency distortion often caused by electrical interference. The electrical interference creates a constant voltage that can cause clicks and pops in the sound output from a loudspeaker. The DC offset removal unit 902 corrects the DC offset in the digital signal $x_{rec}[n]$ produced in the far room 104 as follows:

$$x[n] = ax[n-1] + 0.5(1+a)(x_{rec}[n] - x_{rec}[n-1])$$

where a is a constant ranging from about 0.9 to about 0.9999. The digital signal x[n] is output from the DC offset removal unit 902 and transmitted to both the echo control unit 906 and the loudspeaker 114 in the near room 102. The DC offset removal unit 904 corrects the DC offset in the digital signal $y_{mic}[n]$ produced in the near room 102 as follows:

$$y[n]=ay[n-1]+0.5(1+a)(y_{mic}[n]-y_{mic}[n-1]).$$

The digital signal y[n] is output from the DC offset removal unit 904 and transmitted to the echo control unit 906. The echo-control unit 906 includes a control 908, an impulse response correction 910, a summing junction 912, and an echo control suppressor 914. The digital signal x[n] is transmitted to both the control 908 and the impulse response correction 910, and the digital signal y[n] is transmitted to both the control 908 and the summing junction 912. The control 908 produces an approximate impulse response that is input to impulse response correction 910 and is used to produce an acoustic echo. The acoustic echo is transmitted to the summing junction 912 and subtracted from the digital signal y[n] to produce an output digital signal r̂[n]. Operation of the control 908, impulse response correction 910, and summing junction 912 is described below with reference to FIGS. 10-16. The output digital signal r̂[n] is input to the echo control suppressor 914, which corrects for amplification, or gain, in the output digital signal r̂[n] and outputs a resultant digital signal r[n] that is transmitted to the loudspeaker 116 in the far room 104. Operation of the echo control unit 902 is described below with reference to FIGS. 10A-10B and FIG. 12. Note that in the above description the echo control unit 906 is used to reduce the acoustic echo transmitted from the near room 102 to the far room 104, in FIG. 9. However, in practice, a second echo control unit 906 is needed to reduce an acoustic echo transmitted from the far room 104 to the near room 102. The echo control unit 906 can be located either inside or outside the near room 102.

Figure 10A:
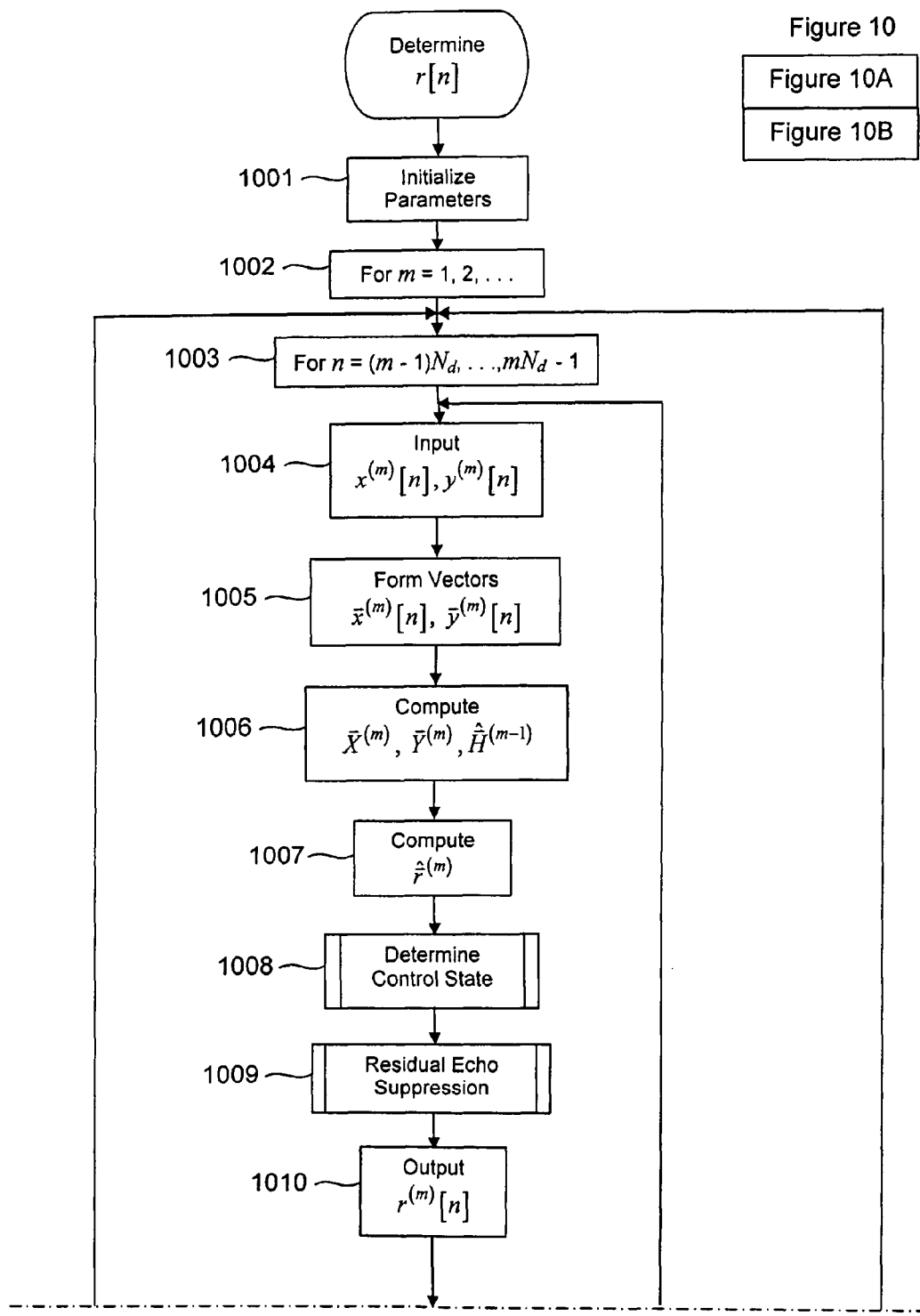
FIGS. 10A-10B show a control-flow diagram that represents one of many embodiments of the present invention for reducing acoustic echoes in audio signals that are transmitted from a first location to a second location.
Figure 10B:
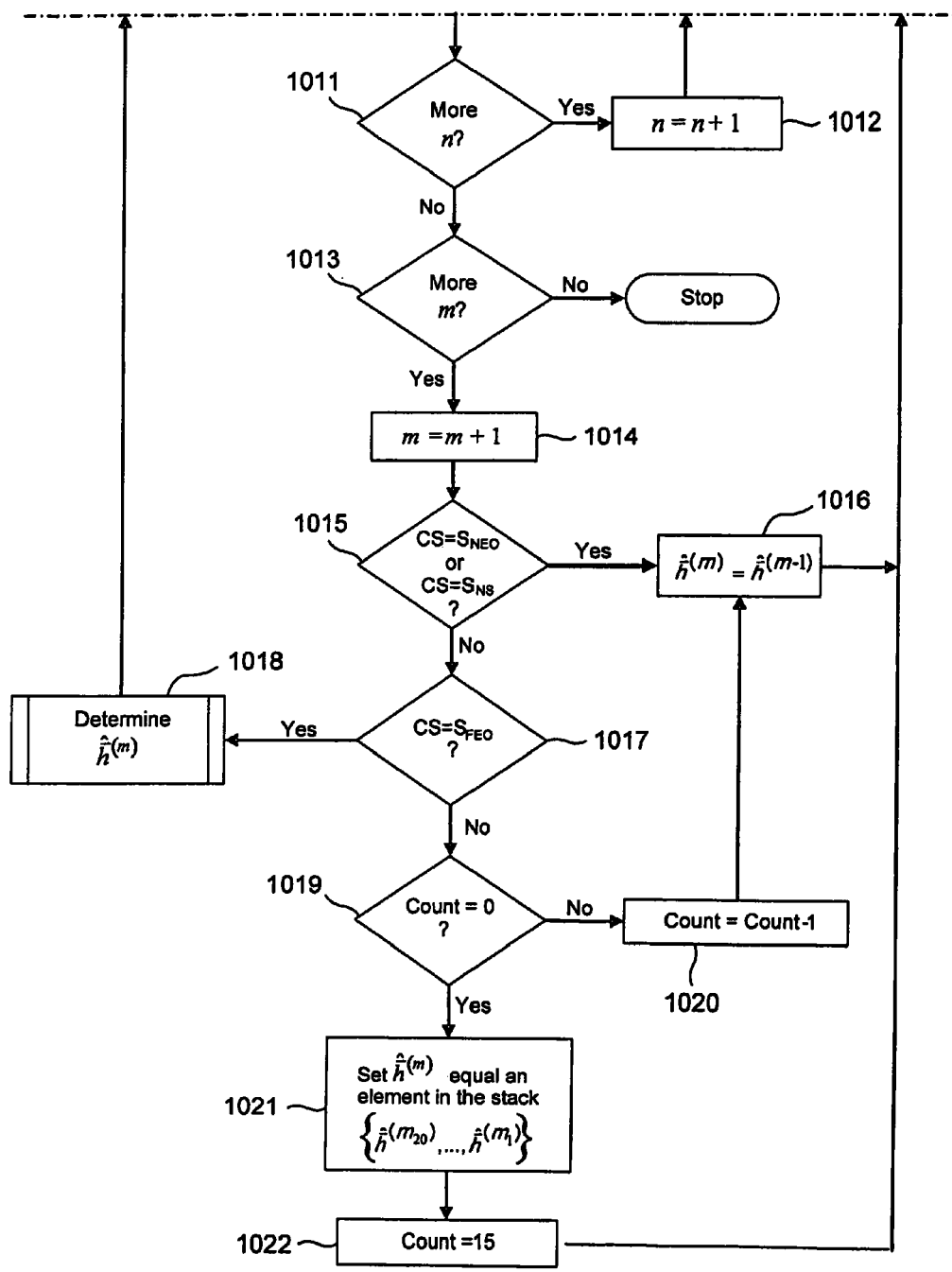

FIGS. 10A-10B show a control-flow diagram that represents one of many embodiments of the present invention for reducing acoustic echoes in audio signals that are transmitted from the near room 102 to the far room 104. In step 1001 of FIG. 10A, values for parameters are initialized as displayed below in Tables 1-3. Table 1 displays fixed parameters and associated values used in the equations described below with reference to FIGS. 10-16:

TABLE 1

| Parameter | Value |
|---|---|
| L | 6000 |
| $N_d$ | 288 |
| P | 5 ($N_d$) |
| N | 8192 |
| β | 0.001 |
| η | 0.001 |
| λ | 0.001 |
| $K_1$ | 0.995 |
| $K_2$ | 0.3 |
| $G_{max}$ | 1.0 |
| $G_{min}$ | 0.1 |

The parameter P is the number of digital signals $y^{(m)}[n]$ in the digital signal vector $\bar{y}^{(m)}[n]$ described below with reference to step 1004 in FIG. 10A. The parameter N is the number of digital signals in the frequency domain vectors $\bar{X}^{(m)}$, $\bar{Y}^{(m)}$, and $\bar{H}^{(m)}$. The parameters β, η, λ, $K_1$, and $K_2$ are weight values that are used to assign relative importance to terms in equations described below with reference to FIGS. 10A-14. The parameters $G_{max}$ and $G_{min}$ are the maximum and minimum gain associated with the microphone 106. Table 2 shows initial values for variable parameters that change during iterations of the methods described below with reference to FIGS. 11A-12:

TABLE 2

| Parameter | Initial Value |
|---|---|
| $\dot{\sigma}_x^{2(0)}$ | 0.01 |
| $\dot{\sigma}_y^{2(0)}$ | 0.01 |
| $\dot{\sigma}_r^{2(0)}$ | 0.01 |
| $\ddot{\sigma}_n^{2(0)}$ | 0.01 |
| $\ddot{\sigma}_x^{2(0)}$ | 0.01 |
| $\ddot{\sigma}_y^{2(0)}$ | 0.01 |
| $M_x^{2(0)}$ | 0 |
| $M_y^{2(0)}$ | 0 |
| $G^{(0)}$ | 0 |

The parameters $\dot{\sigma}_x^{2(0)}$ and $\dot{\sigma}_y^{2(0)}$ are short-term energy variances in the energies associated with the digital signals $x^{(m)}[n]$ and $y^{(m)}[n]$, respectively. The parameter) $\dot{\sigma}_r^{2(0)}$ is the short-term energy variance associated with the energy in the output signal r̂[n]. The parameters $\ddot{\sigma}_x^{2(0)}$ and $\ddot{\sigma}_y^{2(0)}$ are long-term energy variances in the energies associated with the digital signals $x^{(m)}[n]$ and $y^{(m)}[n]$, respectively. The parameter $\ddot{\sigma}_n^{2(0)}$ is a long-term energy variance in the energy associated with the noise v[n]. The parameters $M_x^{2(0)}$ and $M_y^{2(0)}$ are maximum square energies associated with the digital signals $x^{(m)}[n]$ and $y^{(m)}[n]$. The parameter $G^{(0)}$ is an initial gain adaptation value described below with reference to FIG. 12. Table 3 shows initial values for components of vectors $\bar{S}_{xx}^{(0)}, \bar{S}_{\bar{r}\bar{r}}^{(0)}, \bar{\Lambda}^{(0)}, \bar{\tilde{h}}^{(0)},$ and $\hat{\bar{h}}^{(0)}$ that change during iterations of the method described below with reference to FIGS. 13-14:

TABLE 3

| Vector Component | Initial Value | Component Index |
|---|---|---|
| $S_{xx}^{(0)}[k]$ | 1.0 | k = 0, ..., N − 1 |
| $s_{\bar{r}\bar{r}}^{(0)}[k]$ | 1.0 | k = 0, ..., N − 1 |
| $\Lambda^{(0)}[n']$ | 1.0 | n' = 0, ..., L − 1 |
| $\tilde{h}^{(0)}[n']$ | 0.0 | n' = 0, ..., L − 1 |
| $\hat{h}^{(0)}[n']$ | 0.0 | n' = 0, ..., L − 1 |

The vector $\bar{S}_{xx}^{(0)}$ is an initial average spectrum associated with the vector $\bar{X}^{(m)}$, and the vector $\bar{S}_{\bar{r}\bar{r}}^{(0)}$ is an initial average spectrum associated with a vector $\bar{\hat{R}}^{(m)}$, which is described below with reference to step 1302 in FIG. 13. The vector $\bar{\Lambda}^{(0)}$ is described below with reference to step 1305 in FIG. 13. The vector $\bar{\tilde{h}}^{(0)}$ is an initial intermediate impulse response that is described below with reference to step 1308 in FIG. 13. The vector $\hat{\bar{h}}^{(0)}$ is an initial impulse response vector that is described below with reference to step 1309 in FIG. 13. In the for-loop beginning in step 1002, steps 1003-1023 are repeated for each decision epoch m. In the for-loop beginning in step 1003, steps 1004-1012 are repeated for each time sample n. In step 1004, a digital signal $x^{(m)}[n]$ is output from the DC offset 902, and a digital signal $y^{(m)}[n]$ is output from the DC offset 904, in FIG. 9. In step 1005, the digital signals $x^{(m)}[n]$ are used to form an (L+P)-component digital signal vector:

$$\overline{x}^{(m)}[n] = \begin{bmatrix} x^{(m)}[n] \\ x^{(m)}[n-1] \\ \vdots \\ x^{(m)}[n-(L+P-1)] \end{bmatrix},$$

and the digital signals $y^{(m)}[n]$ are used to form a P-component digital signal vector:

$$\overline{y}^{(m)}[n] = \begin{bmatrix} y^{(m)}[n] \\ y^{(m)}[n-1] \\ \vdots \\ y^{(m)}[n-(P-1)] \end{bmatrix}.$$

In step 1006, a FFT is applied to the vectors $\overline{x}^{(m)}[n]$, $\overline{y}^{(m)}$ and $\hat{\overline{h}}^{(m-1)}$ in order to obtain frequency domain vectors:

$$\overline{X}^{(m)} = \begin{bmatrix} X^{(m)}[0] \\ X^{(m)}[1] \\ \vdots \\ X^{(m)}[N-1] \end{bmatrix} = FFT \left\{ \begin{bmatrix} x^{(m)}[n] \\ x^{(m)}[n-1] \\ \vdots \\ x^{(m)}[n-(L+P-1)] \end{bmatrix} \right\},$$

$$\overline{Y}^{(m)} = \begin{bmatrix} Y^{(m)}[0] \\ Y^{(m)}[1] \\ \vdots \\ Y^{(m)}[N-1] \end{bmatrix} = FFT \left\{ \begin{bmatrix} y^{(m)}[n] \\ y^{(m)}[n-1] \\ \vdots \\ y^{(m)}[n-(P-1)] \end{bmatrix} \right\}, \text{ and}$$

$$\overline{H}^{(m-1)} = \begin{bmatrix} H^{(m-1)}[0] \\ H^{(m-1)}[1] \\ \vdots \\ H^{(m-1)}[N-1] \end{bmatrix} = FFT \left\{ \begin{bmatrix} h^{(m-1)}[n] \\ x^{(m-1)}[n-1] \\ \vdots \\ x^{(m-1)}[n-(L-1)] \end{bmatrix} \right\}.$$

In step 1007, an output signal vector is computed as follows:

$$\hat{\overline{r}}^{(m)}[n] = IFFT \left\{ \overline{Y}^{(m)} - \overline{X}^{(m)} \otimes (\hat{\overline{H}}^{(m-1)})^* \right\}$$

where

"$\otimes$" represents a direct product, $$\hat{\overline{r}}^{(m)}[n] = \begin{bmatrix} \hat{r}^{(m)}[n] \\ \hat{r}^{(m)}[n-1] \\ \vdots \\ \hat{r}^{(m)}[n-(N_d-1)] \end{bmatrix}, \text{ and}$$

$\hat{r}^{(m)}$ is the output digital signal output from the summing junction 912, in FIG. 9. The direct product $\otimes$ is a component-wise multiplication of two vectors. For example, the direct product of the 3-tuples (1,2,3) and (3,1,2) is given by:

$(1,2,3) \otimes (3,1,2) = (1 \cdot 3, 2 \cdot 1, 3 \cdot 2) = (3,2,6)$.

In step 1008, the routine "determine control state" is called. The routine "determine control state" identifies four types of audio transmissions that can exist between the near room 102 and the far room 104, in FIG. 9. The four kinds of audio transmission are called "control states" ("CS") and are identified as follows: (1) an audio signal is output from the near end room 102 only and is represented by $S_{NEO}$; (2) an audio signal is output from the far end room 104 only and is represented by $S_{FEO}$; (3) audio signals are simultaneously output from both the near end room 102 and the far end room 104, which is called "double-talk," and is represented by $S_{DT}$; and (4) no audio signals are output from both the near end room 102 and the far end room 104 and is represented by $S_{NS}$. In step 1009, the routine "residual echo suppression" is called in order to compute a gain-corrected output digital signal $r^{(m)}[n]$, as described above with reference to echo suppression 914, in FIG. 9. In step 1010, the gain-corrected output digital signal $r^{(m)}[n]$ is transmitted to loudspeaker 116, in FIG. 9.

In FIG. 10B, step 1011, when n is less than $mN_d-1$, control passes to step 1012, otherwise control passes to step 1013. In step 1012, the time sample n is incremented by "1," and steps 1004-1011 are repeated. In step 1013, when another decision epoch m is available, control passes to step 1014, otherwise the routine "determine r[n]" is terminated. In step 1014, the decision epoch m is incremented by "1." In step 1015, when the CS is either $S_{NEO}$ or $S_{NS}$, control passes to step 1016, otherwise control passes to step 1017. In step 1016, the impulse response is updated by assigning elements in the vector $\hat{h}^{(m)}$ the corresponding values in the vector $\hat{h}^{(m-1)}$. In step 1017, when the CS is $S_{FEO}$, control passes to step 1018, otherwise the CS is $S_{DT}$ and control passes to step 1019. In step 1018, the routine "determine $\hat{h}^{(m)}$" is called and an approximate impulse response vector $\hat{h}^{(m)}$ is computed. In step 1019, when "count" does not equal "0," control passes to step 1020, otherwise control passes to step 1021. In step 1020, the "count" is decremented by "1" and control passes to step 1016. In step 1021, the approximate impulse response $\hat{h}^{(m)}$ is assigned an element of the set $\{\hat{h}^{(m_{20})}, \ldots, \hat{h}^{(m_1)}\}$ with the largest decision epoch represented by $m_i$ and with an associated error return loss, $ERLE^{(m)}$, greater than the number "10." The elements in the set $\{\hat{h}^{(m_{20})}, \ldots, \hat{h}^{(m_1)}\}$ are updated in the routine "determine $\hat{h}^{(m)}$" and is described below with reference to step 1310 and 1310 in FIG. 13. The associated value of $ERLE^{(m)}$ is computed in the routine "determine control state." In step 1022, "count" is assigned the value "15."

Figure 11A:
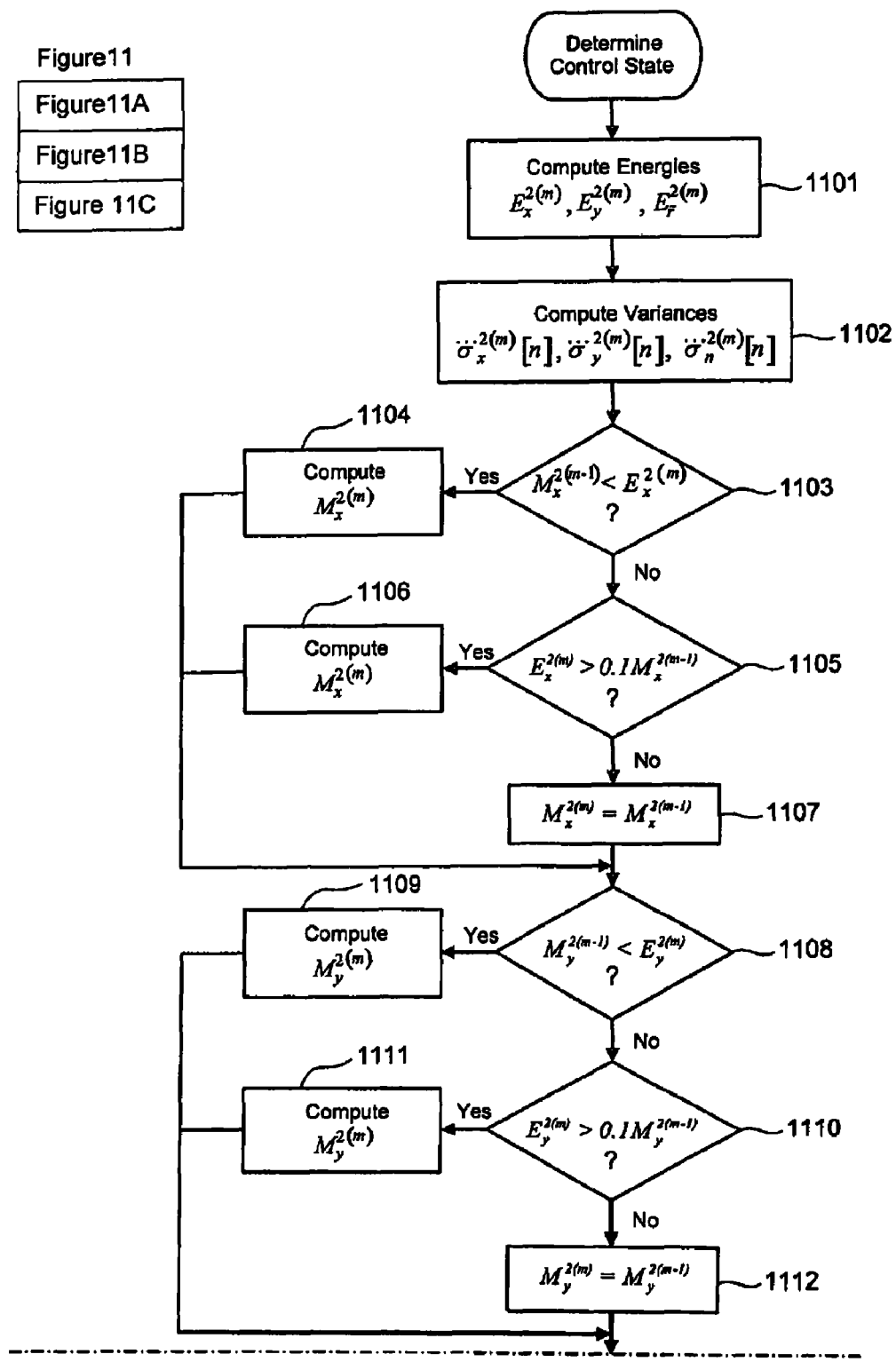
FIGS. 11A-11C is a control-flow diagram for a routine "determine control state" that is called in step 1008 of the control-flow diagram shown in FIG. 10A and that represents one of many embodiments of the present invention.
Figure 11B:
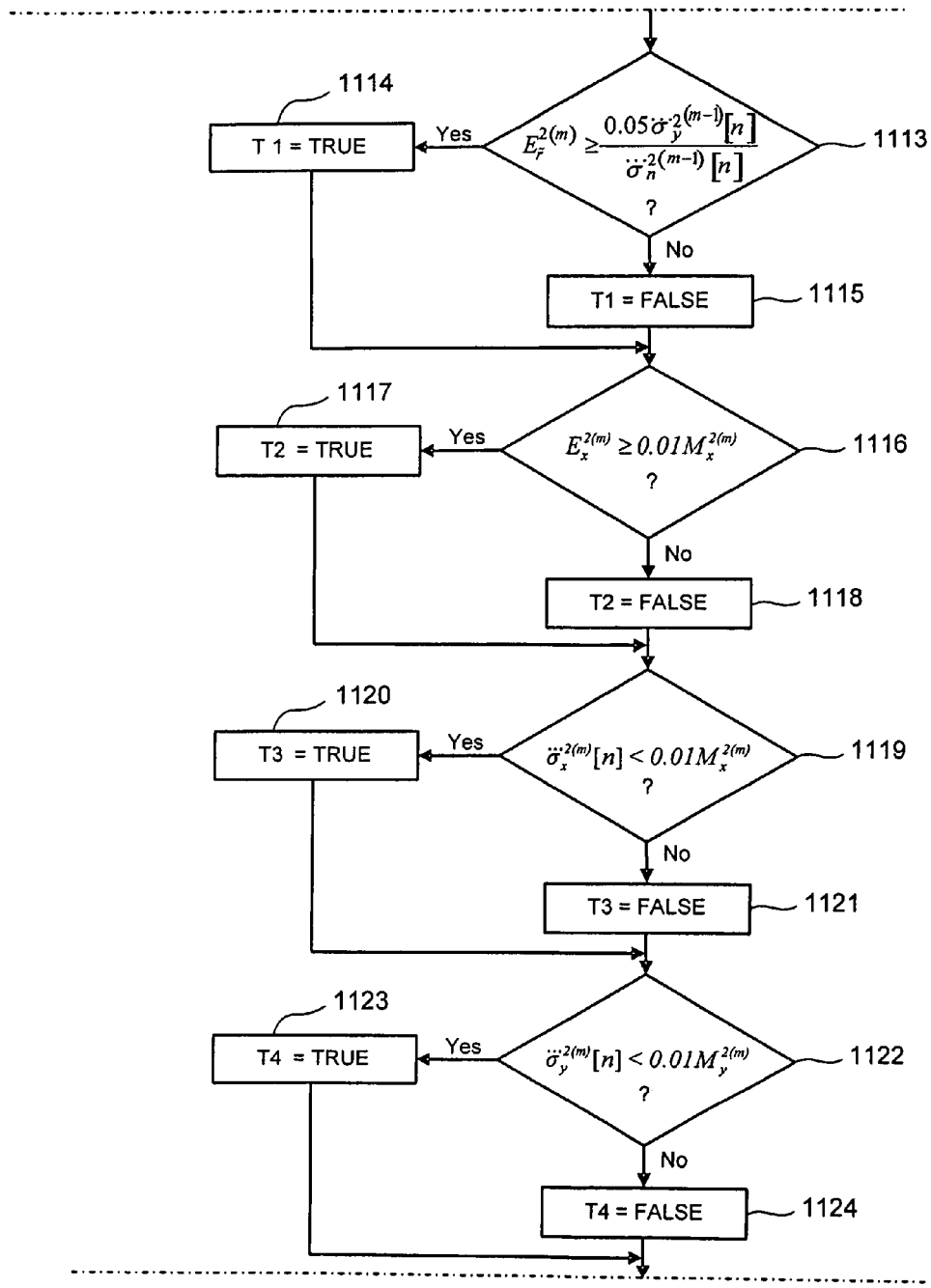
Figure 11C:
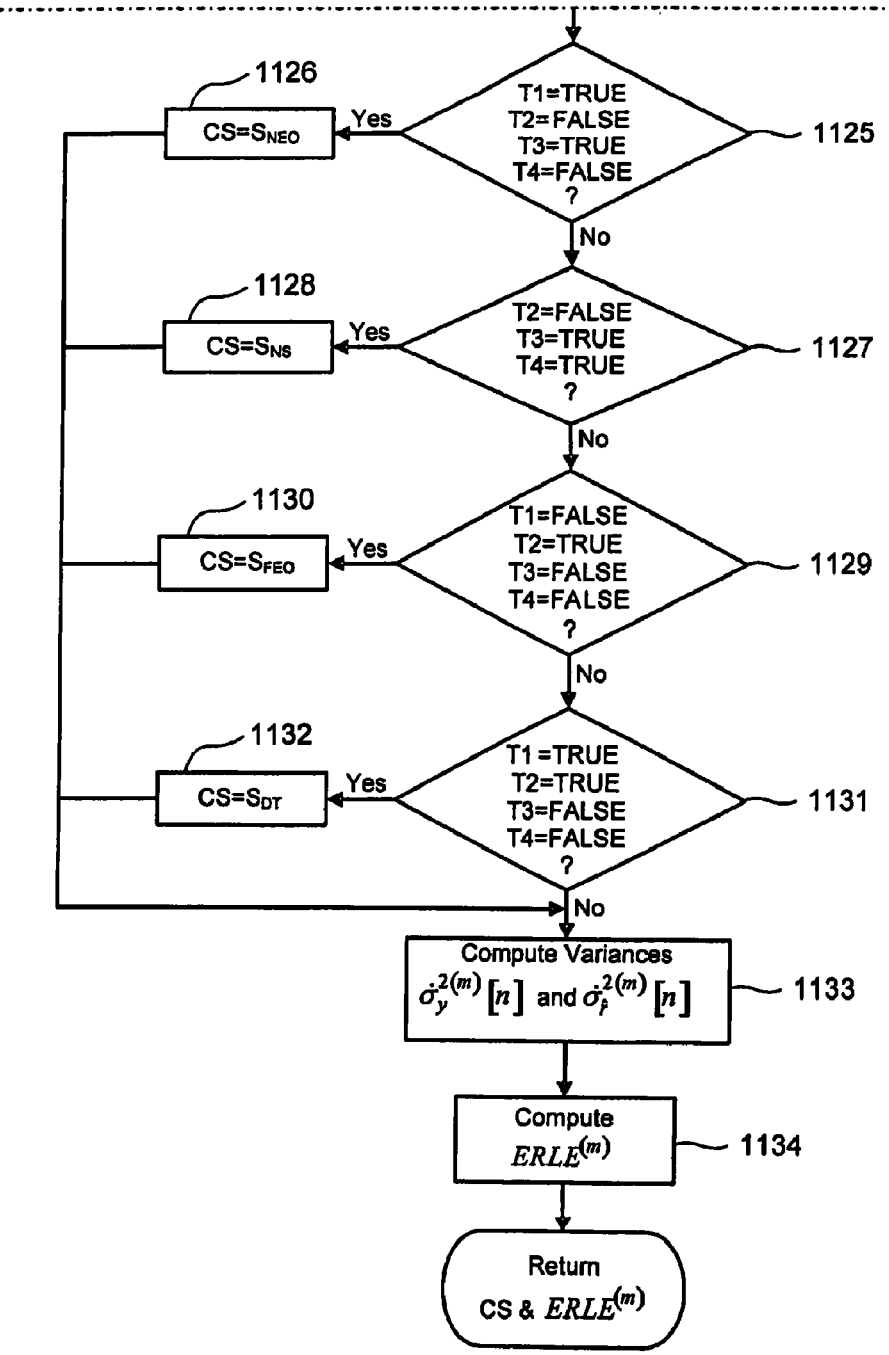

FIGS. 11A-11C show a control-flow diagram for the routine "determine control state" called in step 1008 in FIG. 10A and represents one of many embodiments of the present invention. In FIG. 11A, step 1101, average square energies associated with the vectors $\overline{x}^{(m)}[n]$, $\overline{y}^{(m)}[n]$, and $\hat{\overline{r}}^{(m)}[n]$ are:

$$E_x^{2(m)} = \|\overline{x}^{(m)}[n]\|^2, \quad E_y^{2(m)} = \|\overline{y}^{(m)}[n]\|^2, \text{ and } E_{\hat{r}}^{2(m)} = \|\hat{\overline{r}}^{(m)}[n]\|^2.$$

In step 1102, long-term energy variances are iteratively determined for the average square energies by:

$$\sigma_x^{2(m)}[n] = 0.99 \sigma_x^{2(m-1)}[n] + 0.01 E_x^{2(m)},$$
$$\sigma_y^{2(m)}[n] = 0.99 \sigma_y^{2(m-1)}[n] + 0.01 E_y^{2(m)}, \text{ and}$$
$$\sigma_{\hat{r}}^{2(m)}[n] = 0.99 \sigma_{\hat{r}}^{2(m-1)}[n] + 0.01 E_{\hat{r}}^{2(m)},$$

The coefficients 0.99 and 0.01 are weights that assign a higher relative importance to the variances $\sigma_x^{2(m-1)}[n]$, $\sigma_y^{2(m-1)}[n]$, and $\sigma_{\hat{r}}^{2(m-1)}[n]$ than to the average square energies $E_x^{2(m)}$, $E_y^{2(m)}$, and $E_{\hat{r}}^{2(m)}$. In steps 1103-1107, a maximum square energy $M_x^{2(m)}$ associated with the digital signal vector $\overline{x}^{(m)}[n]$ is determined. In step 1103, when the maximum square energy $M_x^{2(m-1)}$ is less than the average square energy $E_x^{2(m)}$ control passes to step 1104, otherwise control passes to step 1105. In step 1104, the maximum square energy is computed by:

$$M_x^{2(m)} = \min\{E_x^{2(m)}, 10 M_x^{2(m-1)}\}$$

and control passes to step 1108. In step 1105, when the average square energy $E_x^{2(m)}$ is greater than the maximum square energy $M_x^{2(m-1)}$ control passes to step 1106, otherwise control passes to step 1107. In step 1106, the maximum square energy is computed by:

$$M_x^{2(m)} = 0.999 M_x^{2(m-1)} + 0.001 E_x^{2(m)}$$

and control passes to step 1108. The coefficients 0.999 and 0.001 assign a higher relative importance to the maximum square energy $M_x^{2(m-1)}$ than to the average square energy $E_x^{2(m)}$. In step 1107, the maximum square energy $M_x^{2(m-1)}$ is assigned the value of $M_x^{2(m-1)}$. In steps 1108-1112, a maximum square energy $M_y^{2(m)}$ associated with the digital signal vector $\bar{y}^{(m)}[n]$ is determined. In step 1108, when the maximum square energy $M_y^{2(m-1)}$ is less than the average square energy $E_y^{2(m)}$ control passes to step 1109, otherwise control passes to step 1110. In step 1109, the maximum square energy is computed by:

$$M_y^{2(m)} = \min\{E_y^{2(m)}, 10 M_y^{2(m-1)}\}$$

and control passes to step 1113, in FIG. 11B. In step 1110, when the average square energy $E_y^{2(m)}$ is greater than the maximum square energy $M_y^{2(m-1)}$ control passes to step 1111, otherwise control passes to step 1112. In step 1111, the maximum square energy is computed by:

$$M_y^{2(m)} = 0.999 M_y^{2(m-1)} + 0.001 E_y^{2(m)}$$

and control passes to step 1113. In step 1112, the maximum energy $M_y^{2(m)}$ is assigned the value of $M_y^{2(m-1)}$.

In steps 1113-1124 of FIG. 11B, the average square energies $E_x^{2(m)}$ and $E_{\hat{r}}^{2(m)}$, long-term energy variances $\sigma_x^{2(m)}[n]$, $\sigma_y^{2(m)}[n]$, and $\sigma_n^{2(m)}[n]$ and maximum energies $M_x^{2(m)}$ and $M_y^{2(m)}$ are used to determine logic "TRUE" or "FALSE" values of Boolean variables T1, T2, T3, and T4, which are subsequently used in the control-flow diagram in FIG. 11C to determine the CS. In step 1113, when the average square energy $E_{\hat{r}}^{2(m)}$ greater than or equal to $0.05 \sigma_y^{2(m-1)}[n]/\sigma_n^{2(m-1)}[n]$ control passes to step 1114 and T1 is set to "TRUE," otherwise control passes to step 1115 and T1 is set to "FALSE." In step 1116, when the average square energy $E_x^{2(m)}$ is greater than or equal to $0.01 M_x^{2(m)}$, control passes to step 1117 and T2 is set to "TRUE," otherwise control passes to step 1118 and T2 is set to "FALSE." In step 1119, when the long-term variance $\sigma_x^{2(m)}[n]$ is less than $0.01 M_x^{2(m)}$, control passes to step 1120 and T3 is set to "TRUE," otherwise control passes to step 1121 and T3 is set to "FALSE." In step 1122, when the long-term variance $\sigma_y^{2(m)}[n]$ is less than $0.01 M_y^{2(m)}$, control passes to step 1123 and T4 is set to "TRUE," otherwise control passes to step 1124 and T4 is set to "FALSE."

In steps 1125-1131 of FIG. 11C, the Boolean logic values determined in steps 1113-1124 are used to determine the CS. In step 1125, when T1 and T3 are "TRUE," and T2 and T4 are "FALSE," control passes to step 1126 and CS is $S_{NEO}$, otherwise control passes to step 1127. In step 1127, when T3 and T4 are "TRUE," and T2 is "FALSE," control passes to step 1128, and CS is $S_{NS}$, otherwise control passes to step 1129. In step 1129, when T2 is "TRUE" and T1, T3, and T4 are "FALSE," control passes to step 1130, and CS is $S_{FEO}$, otherwise control passes to step 1131. In step 1131, when T1 and T2 are "TRUE," and T3 and T4 are "FALSE," control passes to step 1132, and CS is $S_{DT}$, otherwise control passes to step 1133. In step 1133, short-term variances associated with the average square energies $E_x^{2(m)}$ and $E_{\hat{r}}^{2(m)}$ are given by:

$$\dot{\sigma}_y^{2(m)}[n] = 0.8 \dot{\sigma}_y^{2(m-1)}[n] + 0.2 E_y^{2(m)}, \text{ and}$$
$$\dot{\sigma}_{\hat{r}}^{2(m)}[n] = 0.8 \dot{\sigma}_{\hat{r}}^{2(m-1)}[n] + 0.2 E_{\hat{r}}^{2(m)}$$

The short-term variance coefficients 0.8 and 0.2 are weights that assign a higher relative importance to the variances $\dot{\sigma}_y^{2(m-1)}[n]$ and $\dot{\sigma}_{\hat{r}}^{2(m-1)}[n]$ than to the average square energies $E_y^{2(m)}$ and $E_{\hat{r}}^{2(m)}$. In step 1134, the short-term variances determined in step 1132 are used to calculate an echo return loss associated with the CS. The echo return loss is used to determine the short-term average energy loss of the digital signal $y^{(m)}[n]$ as follows:

$$ERLE^{(m)} = 10 \log_{10}\left(\frac{\dot{\sigma}_y^{2(m)}[n]}{\dot{\sigma}_{\hat{r}}^{2(m)}[n]}\right)$$

The echo return loss can be used to gauge the performance of acoustic echo cancellation when the system in the state $S_{FEO}$. The value of $ERLE^{(m)}$ is larger during $S_{FEO}$ than during $S_{DT}$.

Figure 12:
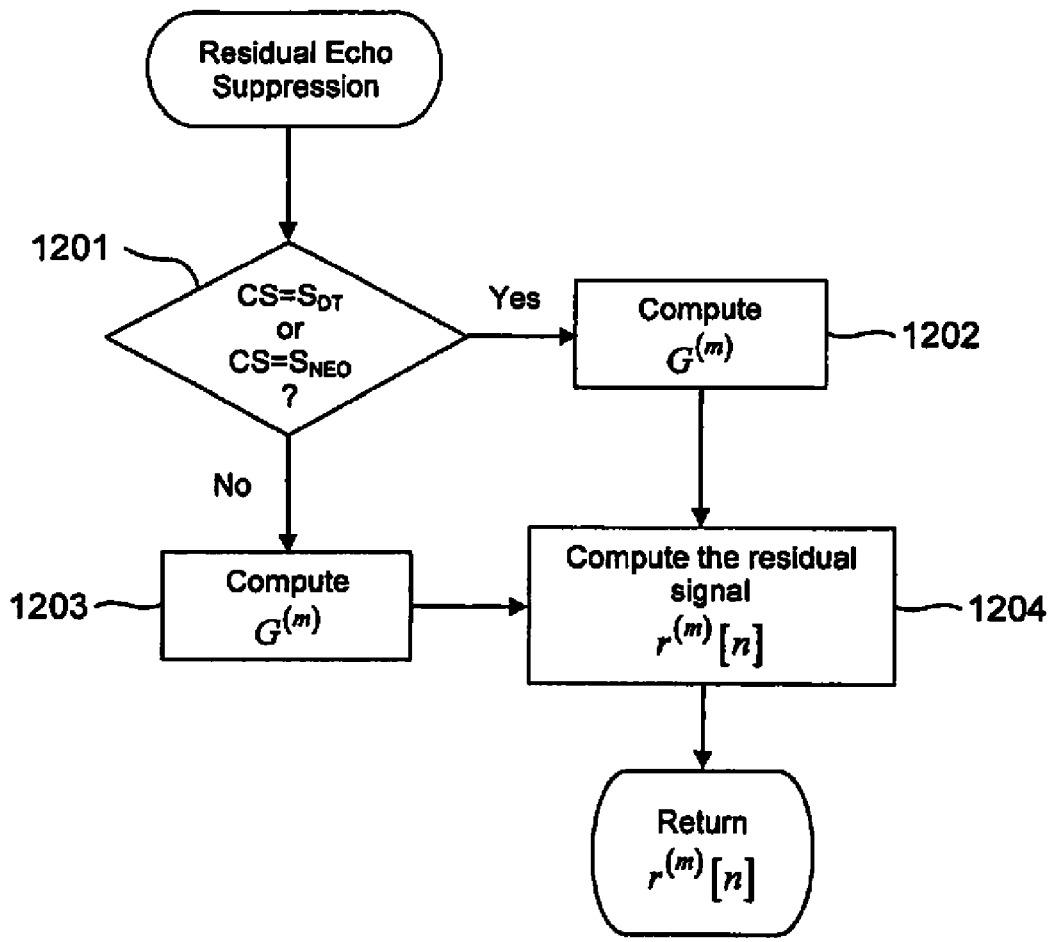
FIG. 12 is a control-flow diagram for a routine "residual echo suppression" that is called in step 1009 of the control-flow diagram shown in FIG. 10A and that represents one of many embodiments of the present invention.

FIG. 12 is a control-flow diagram for the routine "residual echo suppression" called in step 1009 in FIG. 10A and represents one of many embodiments of the present invention. The CS of the audio transmission can be used to correct for gain in the output digital signal $\hat{r}[n]$. For example, during double-talk, or when an audio signal is produced in the near end room only, the gain acquired by the output digital signal $\hat{r}[n]$ is larger than when an audio signal is produced in the far end room only or when there is no audio signal. The maximum and minimum amounts of gain that the output digital signal can acquire are represented by the constants $G_{max}$ and $G_{min}$, respectively. Steps 1201-1204 adjust the gain in output digital signal $\hat{r}[n]$ in accordance with the current CS. In step 1201, when the CS is $S_{DT}$ or $S_{NEO}$, control passes to step 1202, otherwise the CS is either $S_{NS}$ or $S_{NEO}$ and control passes to step 1203. In step 1202, the gain is computed as follows:

$$G^{(m)} = K_2 G^{(m-1)} + (1 - K_2) G_{max}$$

where $K_2$ is a weight that assigns a lower relative importance to $G^{(m-1)}$ than to the maximum gain $G_{max}$. In step 1203, the gain is computed as follows:

$$G^{(m)} = K_1 G^{(m-1)} + (1 - K_1) G_{min}$$

where $K_1$ is a weight that assigns a higher relative importance to $G^{(m-1)}$ than to the minimum gain $G_{min}$. In step 1204, the residual signal is determined by:

$$r^{(m)}[n] = G^{(m)} \hat{r}^{(m)}[n].$$

Figure 13:
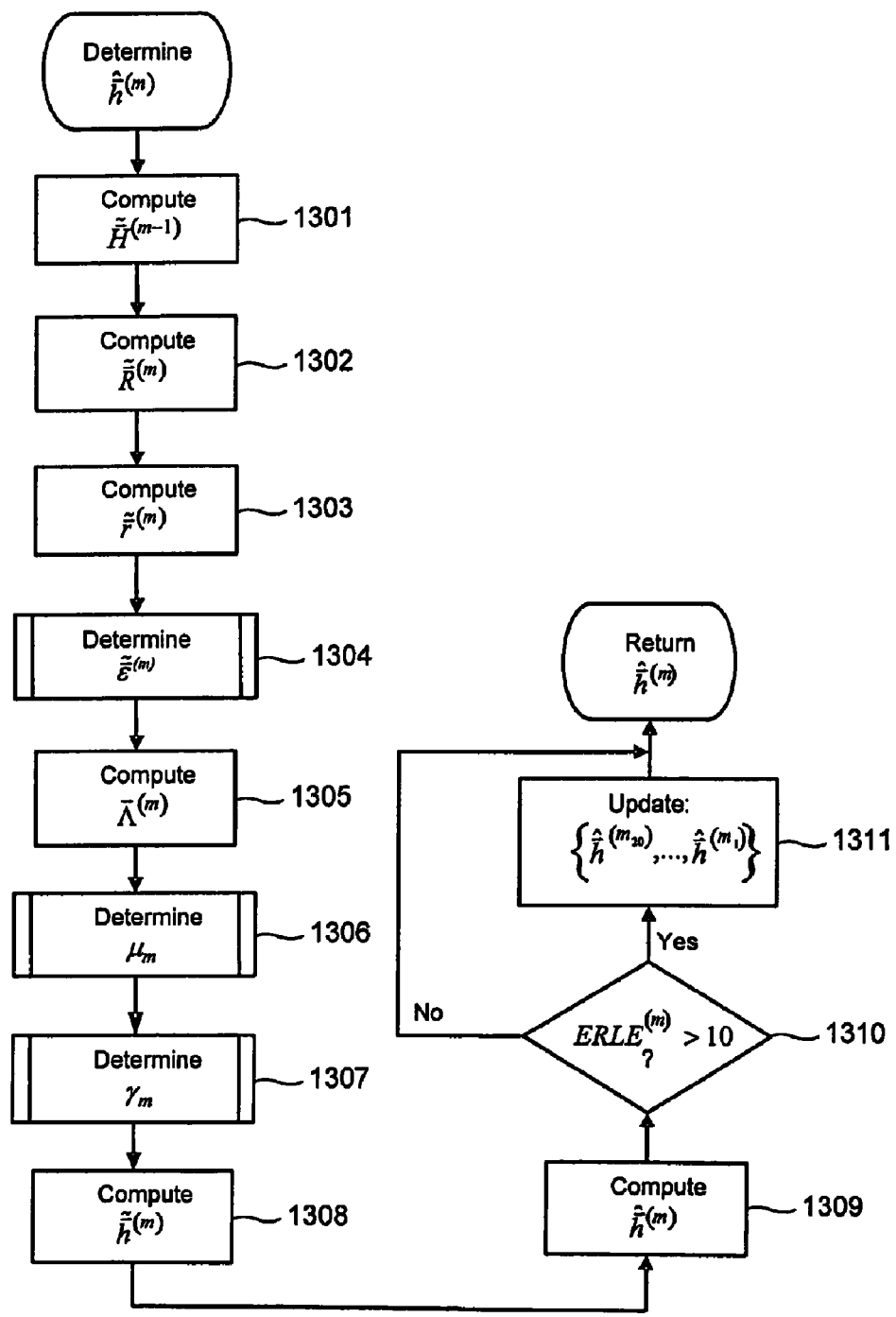
FIG. 13 is a control-flow diagram for a routine "determine $\hat{h}^{(m)}$" that is called in step 1018 of the control-flow diagram shown in FIG. 10B and that represents one of many embodiments of the present invention.

FIG. 13 is a control-flow diagram for the routine "determine $\hat{h}^{(m)}$" called in step 1018 in FIG. 10A and represents one of many embodiments of the present invention. In step 1301, the FFT is applied to the vector $\bar{h}^{(m-1)}$ to obtain a frequency domain dependent vector:

$$\tilde{\bar{H}}^{(m-1)} = \begin{bmatrix} \tilde{H}^{(m-1)}[0] \\ \tilde{H}^{(m-1)}[1] \\ \vdots \\ \tilde{H}^{(m-1)}[N-1] \end{bmatrix} = FFT\left\{ \begin{bmatrix} \tilde{\bar{h}}^{(m-1)}[n] \\ \tilde{\bar{h}}^{(m-1)}[n-1] \\ \vdots \\ \tilde{\bar{h}}^{(m-1)}[n-(L-1)] \end{bmatrix} \right\}.$$

In step 1302, a frequency domain digital signal is computed as follows:

$$\tilde{\overline{R}}^{(m)} = \overline{Y}^{(m)} - \overline{X}^{(m)} \otimes (\tilde{\overline{H}}^{(m-1)})^*$$

where $$\tilde{\overline{R}}^{(m)} = \begin{bmatrix} \tilde{R}^{(m)}[0] \\ \tilde{R}^{(m)}[1] \\ \vdots \\ \tilde{R}^{(m)}[N-1] \end{bmatrix}.$$

In step 1303, an IFFT is applied to the frequency domain digital signal in order to obtain a shadow output digital signal:

$$\tilde{r}^{(m)} = FFT\{\tilde{\overline{R}}^{(m)}\}.$$

In step 1304, the routine "determine $\tilde{\overline{\epsilon}}^{(m)}$" is called. In step 1305, a vector is determined in accordance with the following recursive formula:

$$\overline{\Lambda}^{(m)} = (1-\eta)\overline{\Lambda}^{(m-1)} + \eta \tilde{h}^{(m)} \otimes \tilde{h}^{(m)}.$$

The vector $\overline{\Lambda}^{(m)}$ is used to compute the parameters $\mu_m$ and $\gamma_m$ in subsequent steps 1306 and 1307, respectively. The parameter $\eta$ is a weight that assigns greater importance to $\overline{\Lambda}^{(m-1)}$ than to $\tilde{h}^{(m)} \otimes \tilde{h}^{(m)}$. In step 1306, the routine "determine $\mu_m$" is called, and in step 1307, the routine "determine $\gamma_m$" is called. In step 1308, the vector $\tilde{\overline{\epsilon}}^{(m)}$, determined in the routine called in step 1304, and the parameter $\mu_m$, determined in step 1306, are used to compute an intermediate impulse response vector:

$$\hat{\overline{h}}^{(m)} = \tilde{h}^{(m-1)} + \mu_m \tilde{\overline{\epsilon}}^{(m)}.$$

In step 1309, the approximate impulse response vector is computed as follows:

$$\tilde{h}^{(m)} = (1-\gamma_m)\tilde{h}^{(m-1)} + \gamma_m \hat{\overline{h}}^{(m)}.$$

The parameter $\gamma_m$ is a weight that assigns a level importance to the intermediate impulse response vector $\hat{\overline{h}}^{(m)}$ and to the approximate impulse response $\tilde{h}^{(m-1)}$. In step 1310, when the $ERLE^{(m)}$ is greater than the number "10," control passes to step 1311. In step 1311, the ordered set of impulse response vectors:

$$\{\tilde{h}^{(m_{20})}, \tilde{h}^{(m_{19})}, \ldots, \tilde{h}^{(m_2)}, \tilde{h}^{(m_1)}\}$$

is updated. The impulse response vectors are arranged in order of increasing associated decision epoch values as follows $m_{20} < m_{19} < \ldots < m_2 < m_1$ and the set is updated by removing the impulse response vector $\tilde{h}^{(m_{20})}$ and including the impulse response vector $\tilde{h}^{(m)}$ in order to obtain an ordered set of impulse responses:

$$\{\tilde{h}^{(m_{19})}, \tilde{h}^{(m_{18})}, \ldots, \tilde{h}^{(m_1)}, \tilde{h}^{(m)}\}$$

where $m_{19} < m_{18} < \ldots < m_1 < m$.

Figure 14:
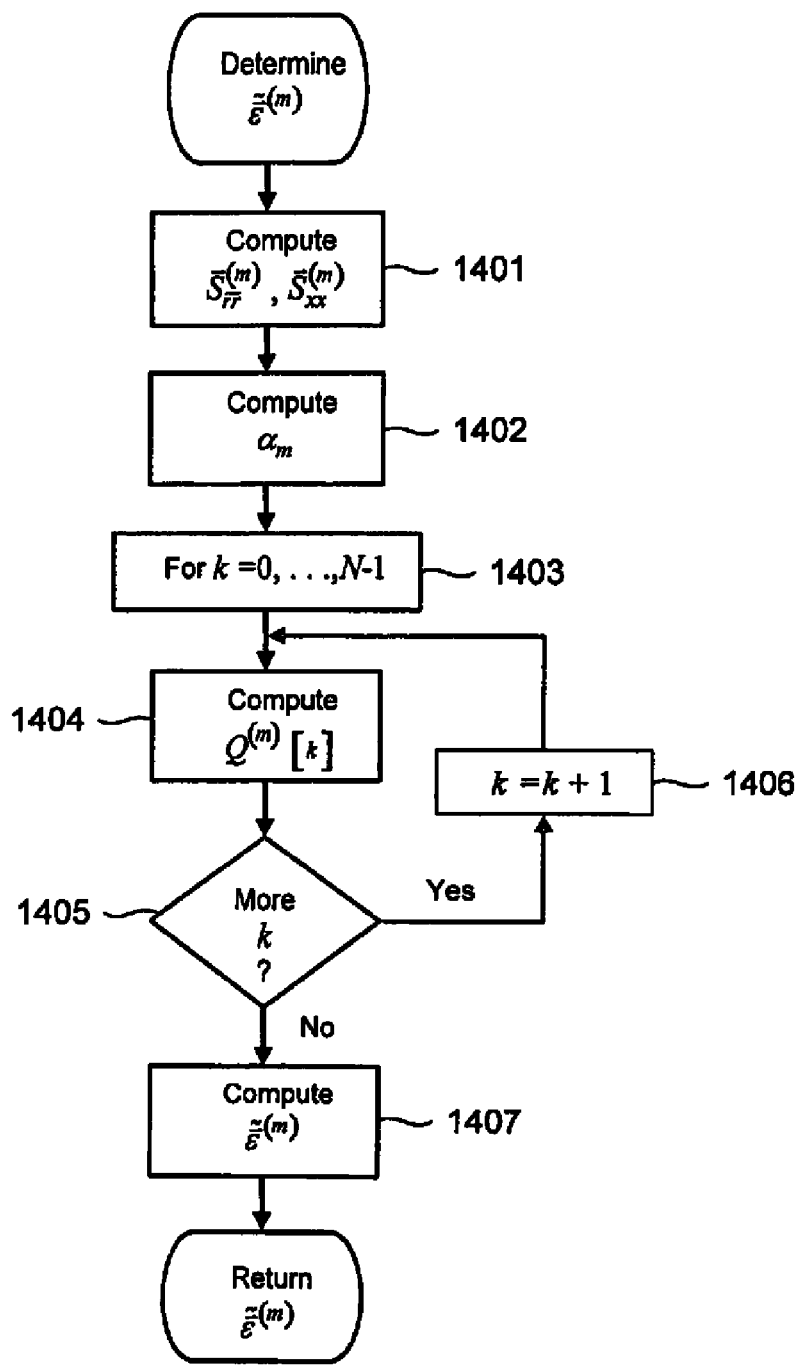
FIG. 14 is a control-flow diagram for a routine "determine $\hat{\tilde{\epsilon}}^{(m)}$" that is called in step 1304 of the control-flow diagram shown in FIG. 13 and that represents one of many embodiments of the present invention.

FIG. 14 is a control-flow diagram for the routine "determine $\tilde{h}^{(m)}$" called in step 1304 in FIG. 13 and represents one of many embodiments of the present invention. In step 1401, an average spectrum of the frequency domain vector $\overline{X}^{(m)}$ is computed as follows:

$$\overline{S}_{xx}^{(m)} = (1-\beta)\overline{S}_{xx}^{(m-1)} + \beta \overline{X}^{(m)} \otimes \overline{X}^{(m)}$$

and an average spectrum of the vector $\tilde{\overline{R}}^{(m)}$ is computed as follows:

$$\overline{S}_{\tilde{r}\tilde{r}}^{(m)} = (1-\beta)\overline{S}_{\tilde{r}\tilde{r}}^{(m-1)} + \beta \tilde{\overline{R}}^{(m)} \otimes \tilde{\overline{R}}^{(m)}$$

where $$\overline{S}_{xx}^{(m)} = \begin{bmatrix} S_{xx}^{(m)}[0] \\ S_{xx}^{(m)}[1] \\ \vdots \\ S_{xx}^{(m)}[N-1] \end{bmatrix}, \text{ and}$$

$$\overline{S}_{\tilde{r}\tilde{r}}^{(m)} = \begin{bmatrix} S_{\tilde{r}\tilde{r}}^{(m)}[0] \\ S_{\tilde{r}\tilde{r}}^{(m)}[1] \\ \vdots \\ S_{\tilde{r}\tilde{r}}^{(m)}[N-1] \end{bmatrix}.$$

The parameter $\beta$ is a weight that assigns greater importance to the vectors the vectors $\overline{S}_{xx}^{(m-1)}$ and $\overline{S}_{\tilde{r}\tilde{r}}^{(m-1)}$ than to the direct products $\overline{X}^{(m)} \otimes \overline{X}^{(m)}$ and $\tilde{\overline{R}}^{(m)} \otimes \tilde{\overline{R}}^{(m)}$. In step 1402, the long-term variances $\hat{\sigma}_x^{2(m)}[n]$ and $\hat{\sigma}_y^{2(m)}[n]$, computed in step 1102 of FIG. 11A, are used to determine:

$$\alpha_m = \frac{\hat{\sigma}_x^{2(m)}[n]}{\hat{\sigma}_y^{2(m)}[n]}$$

In steps 1403-1406, elements of an N-component preconditioning vector, $\overline{Q}^{(m)}$, are determined. In the for-loop beginning in step 1403, steps 1404-1406 are repeated for each frequency domain index k. In step 1404, the elements of the preconditioning vector $\overline{Q}^{(m)}$ are calculated as follows:

$$Q^{(m)}[k] = \frac{1}{\max\{S_{xx}^{(m)}[k] + \alpha_m S_{\tilde{r}\tilde{r}}^{(m)}[k], \lambda\}}$$

where k ranges from 0 to N−1. In step 1405, when k is less than N−1, control passes to step 1406, otherwise control passes to step 1407. In step 1406, the index k is incremented by the value "1." In step 1407, the vector $\tilde{\overline{\epsilon}}^{(m)}$ is computed as follows:

$$\tilde{\overline{\epsilon}}^{(m)} = IFFT\{\overline{Q}^{(m)} \otimes \overline{X}^{(m)} \otimes (\tilde{\overline{R}}^{(m)})^*\}$$

where $$\tilde{\overline{\epsilon}}^{(m)} = \begin{bmatrix} \tilde{\epsilon}[0] \\ \tilde{\epsilon}[1] \\ \vdots \\ \tilde{\epsilon}[L-1] \end{bmatrix}$$

Figure 15:
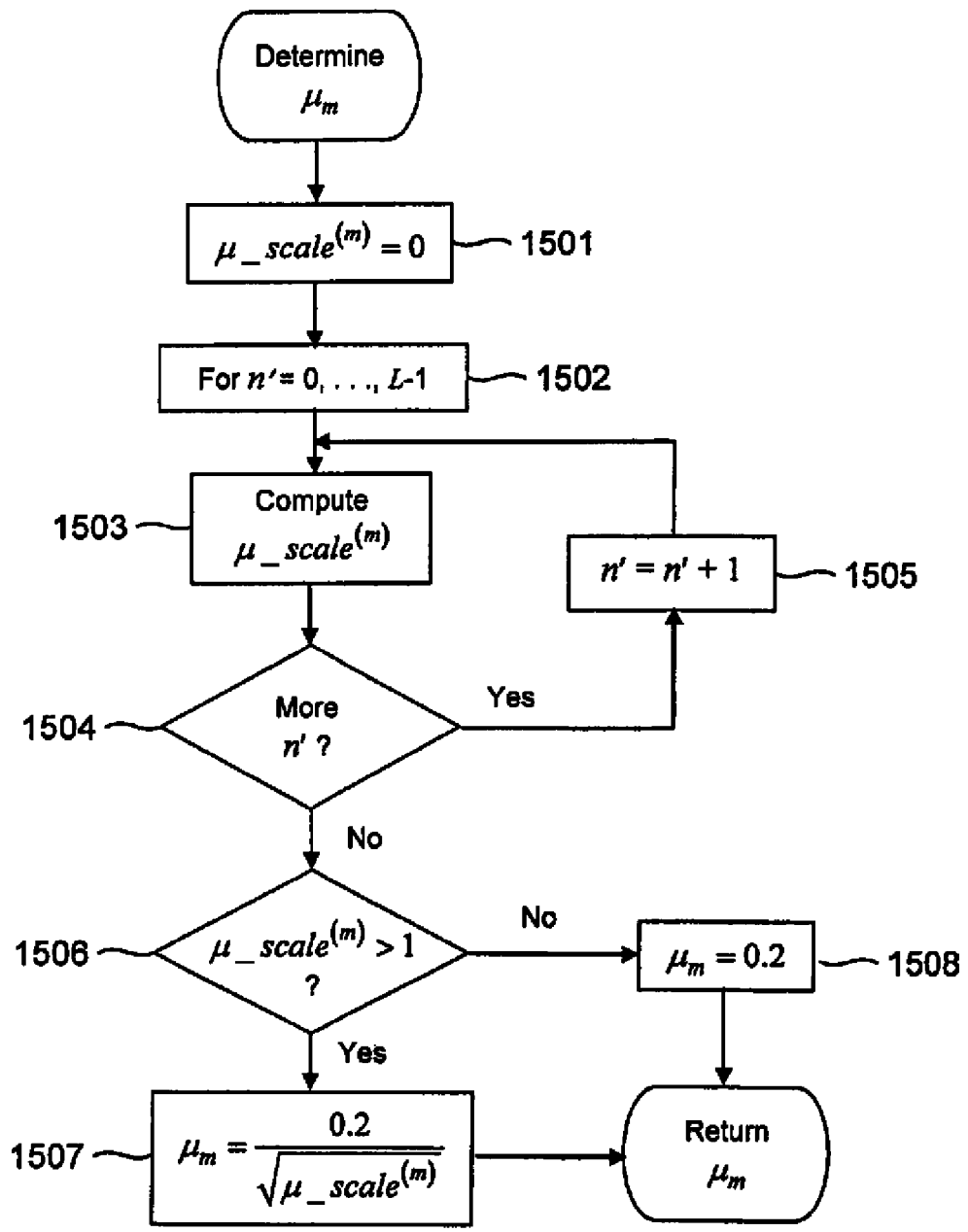
FIG. 15 is a control-flow diagram for a routine "determine $\mu_m$" that is called in step 1306 of the control-flow diagram shown in FIG. 13 and that represents one of many embodiments of the present invention.

FIG. 15 is a control-flow diagram for the routine "determine $\mu_m$" called in step 1306 in FIG. 13 and represents one of many embodiments of the present invention. In step 1501, a parameter $\mu\_scale^{(m)}$ is assigned the value "0." In the for-loop beginning in step 1502, steps 1503-1505 are repeated. In step 1503, the parameter $\mu\_scale^{(m)}$ is assigned the value:

$$\mu\_scale^{(m)} + \frac{(\tilde{\epsilon}^{(m)}[n'])^2}{\Lambda^{(m)}[n']}$$

In step 1504, when n' is less than L−1, control passes to 1505, otherwise control passes to step 1506. In step 1505, the index n' is incremented by the value "1." In step 1506, when $\mu\_scale^{(m)}$ is greater than the value "1," control passes to step 1507, otherwise control passes to step 1508. In step 1507, $\mu_m$ is assigned the value $0.2/\sqrt{\mu\_scale^{(m)}}$. In step 1508, $\mu_m$ is assigned the value "0.2."

Figure 16:
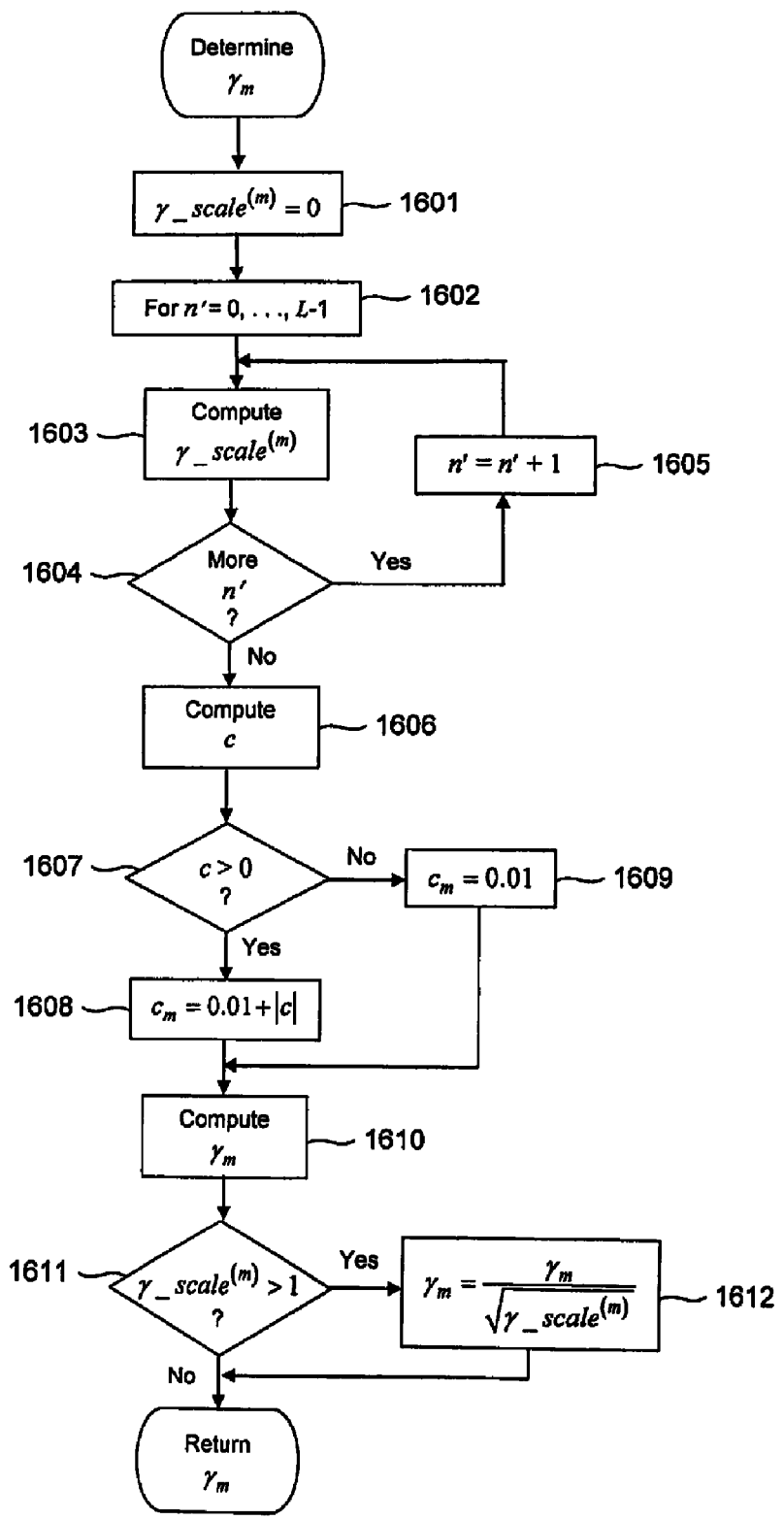
FIG. 16 is a control-flow diagram for a routine "determine $\gamma_m$" that is called in step 1307 of the control-flow diagram shown in FIG. 13 and that represents one of many embodiments of the present invention.

FIG. 16 is a control-flow diagram for the routine "determine $\gamma_m$" called in step 1307 in FIG. 13 and represents one of many embodiments of the present invention. In step 1601, a parameter $\gamma\_scale^{(m)}$ is assigned the value "0." In the for-loop beginning in step 1602, steps 1603-1605 are repeated. In step 1603, the parameter $\gamma\_scale^{(m)}$ is iteratively computed as follows:

$$\gamma\_scale^{(m)} = \gamma\_scale^{(m)} + \frac{1}{L} \frac{(\tilde{h}^{(m)}[n'])^2}{\Lambda^{(m)}[n']}$$

In step 1604, when n' is less than L−1, control passes to step 1605, otherwise control passes to step 1606. In step 1605, the index n' is increment by "1." In step 1606, a constant c is computed as follows:

$$c = 400 \cdot \log_{10}\left(\frac{\|\tilde{r}^{(m)}\|^2}{\|\tilde{r}^{(m)}\|^2}\right)$$

where the vector $\tilde{r}^{(m)}$ is determined in step 1303, of FIG. 13, and the vector $\tilde{r}^{(m)}$ is determined in the step 1007, of FIG. 10A. In step 1607, when the constant c is greater than the number "0," control passes to step 1608, otherwise control passes to step 1609. In step 1608, a parameter $c_m$ is assigned the value 0.01+|c|. In step 1609, the parameter $c_m$ is assigned the value "0.01." In step 1610, the parameter $\gamma_m$ is computed as follows:

$$\gamma_m = \frac{c_m}{c_m + 0.25 \min[m, 20000]}$$

where "min" refers to the minimum value of either m or the value "20000." In step 1611, when $\gamma\_scale^{(m)}$ is greater than the number "1," control passes to step 1612. In step 1612, the parameter $\gamma_m$ is assigned the value $\gamma_m/\sqrt{\gamma\_scale^{(m)}}$.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for reducing an acoustic echo in audio signals transmitted between a first location and a second location over a communication system, the method comprising:
    receiving a first digital signal and/or a second digital signal, the first digital signal encodes sounds produced at the first location and the second digital signal encodes an acoustic echo and sounds produced at the second location;
    computing a control state identifying the signals as being output from the first location and/or the second location;
    computing an approximate acoustic echo of the acoustic echo detected at the second location based on the control state;
    subtracting the approximate acoustic echo from the second digital signal to produce an output digital signal; and
    transmitting the output digital signal to the first location.

2. The method of claim 1 further comprises removing gain from the output digital signal based on the control state.

3. The method of claim 1, wherein the control state represents one of:
    an audio signal produced at the first location only;
    an audio signal produced at the second location only;
    audio signals simultaneously produced at both the first location and the second location; and
    no audio signals produced at either the first location or the second location.

4. The method of claim 1, wherein computing the approximate acoustic echo further comprises generating an approximate impulse response, $\hat{h}^{(m)}$ where m is a positive integer that represents a decision epoch of a decision period, each decision period comprising $N_d$ time samples.

5. The method of claim 4, wherein generating the approximate impulse response further comprises that when no audio signals are transmitted between the first location and the second location or when an audio signal is produced at the second location only, the approximate impulse response is given by:

$$\hat{h}^{(m)} = \hat{h}^{(m-1)}.$$

6. The method of claim 4, wherein generating the approximate impulse response further comprises that when an audio signal is produced at the first location only, the approximate impulse response is determined recursively by:

$$\hat{h}^{(m)} = (1-\gamma_m)\hat{h}^{(m-1)} + \gamma_m \tilde{h}^{(m)}$$

where
    $\tilde{h}^{(m)}$ is an intermediate impulse response, and
    $\gamma_m$ is a weight that assigns a level of importance to the intermediate impulse response $\tilde{h}^{(m)}$ and to the approximate impulse response $\hat{h}^{(m-1)}$ for the decision epoch m−1.

7. The method of claim 4, wherein generating the approximate impulse response further comprises that when the control state transitions from no audio signal or the audio signal produces at the first location to an audio signal produced the second location or the simultaneously produced audio signal, the approximate impulse response is determined by setting $\hat{h}^{(m)}$ equal to an approximate impulse response the set:

$$\{\hat{h}^{(m20)}, \hat{h}^{(m19)}, \ldots, \hat{h}^{(m2)}, \hat{h}^{(m1)}\}$$

with the largest decision epoch value and having an echo return loss greater than 10, the echo return loss given by:

$$ERLE^{(m)} = 10 \log_{10}\left(\frac{\dot{\sigma}_y^{2(m)}[n]}{\dot{\sigma}_{\hat{r}}^{2(m)}[n]}\right)$$

where $\dot{\sigma}_y^{2(m-1)}[n]$ and $\dot{\sigma}_{\hat{r}}^{2(m-1)}[n]$ are the variances in the average square energies associated with the second digital signal and the output digital signal, respectively.

8. A method for computing a control state of a communication system, the method comprising:
   providing a first digital signal and a second digital signal, the first digital signal produced at a first location, and second digital signal encodes an acoustic echo and sounds produced at the second location;
   computing an average square energy, $E_x^{2(m)}$, associated with the first digital signal, an average square energy, $E_y^{2(m)}$, associated with the second digital signal, and an average square energy, $E_{\hat{r}}^{2(m)}$, associated with noise, at a decision epoch m of a decision period having $N_d$ time samples;
   computing a maximum square energy of the first digital signal and a maximum square energy of the second digital signal, at the decision epoch m;
   computing variances in the average square energies associated with the first digital signal, the second digital signal, and the noise, at the decision epoch m; and
   computing the control state by comparing the average square energies, the maximum square energies, and the variances, at the decision epoch m.

9. The method of claim 8, wherein computing the average square energy of the first digital signal, the second digital signal, and the noise further comprises:

$$E_x^{2(m)} = \|\bar{x}^{(m)}[n]\|^2,$$
$$E_y^{2(m)} = \|\bar{y}^{(m)}[n]\|^2, \text{ and}$$
$$E_{\hat{r}}^{2(m)} = \|\bar{\hat{r}}^{(m)}[n]\|^2,$$

respectively, where $$\bar{x}^{(m)}[n] = \begin{bmatrix} x^{(m)}[n] \\ x^{(m)}[n-1] \\ \vdots \\ x^{(m)}[n-(L+P-1)] \end{bmatrix},$$

$$\bar{y}^{(m)}[n] = \begin{bmatrix} y^{(m)}[n] \\ y^{(m)}[n-1] \\ \vdots \\ y^{(m)}[n-(P-1)] \end{bmatrix},$$

$$\bar{\hat{r}}^{(m)}[n] = \begin{bmatrix} \hat{r}^{(m)}[n] \\ \hat{r}^{(m)}[n-1] \\ \vdots \\ \hat{r}^{(m)}[n-(L-1)] \end{bmatrix},$$

n represents a time sample index, L represents the number of components comprising an impulse response associated with detecting the first digital signal, and P represents the number of points in the second digital signal.

10. The method of claim 8, wherein computing the maximum square energy of the digital signal further comprises computing:

$$M_z^{2(m)} = \min\{E_z^{2(m)}, 10 M_z^{2(m-1)}\}$$

when $$M_z^{2(m-1)} < E_z^{2(m)}$$

where $M_z^{2(m)}$ represents the maximum square energy of the digital signal, and the subscript z represents x, y or $\tilde{r}$.

11. The method of claim 8, wherein computing the maximum square energy of the digital signal further comprises computing:

$$M_z^{2(m)} = 0.999 M_z^{2(m)} + 0.001 E_z^{2(m)}$$

when $$E_z^{2(m)} > 0.1 M_z^{2(m-1)}$$

where $M_z^{2(m)}$ represents the maximum square energy of the digital signal, and the subscript z represents x, y or $\tilde{r}$.

12. The method of claim 8, wherein computing the maximum square energy further comprises:

$$M_z^{2(m)} = M_z^{2(m-1)}$$

when:

$$M_z^{2(m-1)} \geq E_z^{2(m)}, \text{ and } E_z^{2(m)} \geq 0.1 M_z^{2(m-1)},$$

where $M_z^{2(m)}$ represents the maximum square energy of the digital signal, and the subscript z represents x, y or $\tilde{r}$.

13. The method of claim 8, variances in the average square energies associated with the first digital signal, the second digital signal, and, the noise are determined, by:

$$\dot{\sigma}_x^{2(m)}[n] = 0.99 \dot{\sigma}_x^{2(m-1)}[n] + 0.1 E_x^{2(m)},$$
$$\dot{\sigma}_y^{2(m)}[n] = 0.99 \dot{\sigma}_y^{2(m-1)}[n] + 0.01 E_y^{2(m)}, \text{ and}$$
$$\dot{\sigma}_n^{2(m)}[n] = 0.99 \dot{\sigma}_n^{2(m-1)}[n] + 0.01 E_{\hat{r}}^{2(m)}$$

where $\dot{\sigma}_x^{2(m)}$, $\dot{\sigma}_y^{2(m)}$, $\dot{\sigma}_n^{2(m)}$ represent variances in the aver square energies $E_x^{2(m)}$, $E_y^{2(m)}$, and $E_{\hat{r}}^{2(m)}$, respectively.

14. The method of claim 8, wherein the control state represents an audio signal transmitted from the second location only when:

$$E_{\hat{r}}^{2(m)} \geq \frac{0.05 \dot{\sigma}_y^{2(m-1)}[n]}{\dot{\sigma}_n^{2(m-1)}[n]},$$

$$E_x^{2(m)} < 0.01 \ M_x^{2(m)},$$

$$\dot{\sigma}_x^{2(m)}[n] < 0.01 \ M_x^{2(m)}, \text{ and}$$

$$\dot{\sigma}_y^{2(m)}[n] \geq 0.01 \ M_y^{2(m)}.$$

15. The method of claim 8, wherein the control state represents no audio signals transmitted between either the first location or the second location when:

$$E_x^{2(m)} < 0.01 M_x^{2(m)}, \dot{\sigma}_x^{2(m)}[n] < 0.01 M_x^{2(m)}, \text{ and}$$
$$\dot{\sigma}_y^{2(m)}[n] < 0.01 M_y^{2(m)}.$$

16. The method of claim 8, wherein the control state represents an audio signal transmitted from the first location only when:

$$E_{\hat{r}}^{2(m)} < \frac{0.05 \ \dot{\sigma}_y^{2(m-1)}[n]}{\dot{\sigma}_n^{2(m-1)}[n]},$$

$$E_x^{2(m)} \geq 0,01 \ M_x^{2(m)},$$

$$\dot{\sigma}_x^{2(m)}[n] \geq 0.01 \ M_x^{2(m)}, \text{ and}$$

$$\dot{\sigma}_y^{2(m)}[n] \geq 0.01 \ M_y^{2(m)}.$$

17. The method of claim 8, wherein the control state represents audio signals simultaneously transmitted between the first location and the second location when:

$$E_{\hat{r}}^{2(m)} \geq \frac{0.05 \; \hat{\sigma}_y^{2(m-1)}[n]}{\hat{\sigma}_n^{2(m-1)}[n]},$$

$$E_x^{2(m)} \geq 0.01 \; M_x^{2(m)},$$

$$\hat{\sigma}_x^{2(m)}[n] \geq 0.01 \; M_x^{2(m)}, \text{ and}$$

$$\hat{\sigma}_y^{2(m)}[n] \geq 0.01 \; M_y^{2(m)}.$$

18. A system for reducing an acoustic echo in an audio signal comprising:
    a computer system that runs a computer program; and
    a program stored in memory and having instructions enabling one or ore processors to perform the operations of:
    receives a first digital signal and/or a second digital signal, the first digital signal encodes sounds produced at the first location and the second digital signal encodes an acoustic echo and sounds produced at the second location;
    computes a control state identifying the signals as being output from the first location and/or the second location;
    computes an approximate acoustic echo of the acoustic echo detected at the second location based on the control state;
    subtracts the approximate acoustic echo from the second digital signal to produce an output digital signal: and
    transmits the output digital signal to the first location.

19. The system of claim 18 further comprises removes gain from the output digital signal based on the control state.

20. The system of claim 18, wherein produces the approximate acoustic echo further comprises produces an approximate impulse response, $\hat{h}^{(m)}$, where m is a positive integer that represents a decision epoch of a decision period, each decision period comprising $N_d$ time samples.

\* \* \* \* \*

UNITED STATES PATENT AND TRADEMARK OFFICE
CERTIFICATE OF CORRECTION

PATENT NO. : 8,045,730 B1  
APPLICATION NO. : 11/407413  
DATED : October 25, 2011  
INVENTOR(S) : Majid Fozunbal et al.

Page 1 of 2

It is certified that error appears in the above-identified patent and that said Letters Patent is hereby corrected as shown below:

On the Title Page, Item (75), Inventors, line 3, delete "Schater," and insert -- Schafer, --, therefor.

In column 22, line 33, in Claim 4, delete " $\hat{h}^{(m)}$ " and insert -- $\hat{h}^{(m)}$, --, therefor.

In column 23, line 11, in Claim 7, delete "respectively," and insert -- respectively. --, therefor.

In column 24, line 12, in Claim 10, delete " $\overline{r}.$ " and insert -- $\tilde{r}.$ --, therefor.

In column 24, line 21, in Claim 11, delete " $\overline{r}.$ " and insert -- $\tilde{r}.$ --, therefor.

In column 24, line 29, in Claim 12, delete " $E_z^{2(m)} \geqq 0.1 M_z^{2(m-1)}$, " and insert -- $E_z^{2(m)} \leq 0.1 M_z^{2(m-1)}$, --, therefor.

In column 24, line 33, in Claim 13, delete "and," and insert -- and --, therefor.

In column 24, line 33, in Claim 13, delete "determined," and insert -- determined --, therefor.

In column 24, line 35, in Claim 13, delete " $\ddot{\sigma}_x^{2(m)}[n] = 0.99 \ddot{\sigma}_x^{2(m-1)}[n] + 0.1 E_x^{2(m)}$, " and insert -- $\ddot{\sigma}_x^{2(m)}[n] = 0.99 \ddot{\sigma}_x^{2(m-1)}[n] + 0.01 E_x^{2(m)}$, --, therefor.

In column 24, line 38, in Claim 13, delete "aver" and insert -- average --, therefor.

Signed and Sealed this  
Sixteenth Day of October, 2012

David J. Kappos  
*Director of the United States Patent and Trademark Office*

CERTIFICATE OF CORRECTION (continued)
U.S. Pat. No. 8,045,730 B1

In column 24, line 63, in Claim 16, delete "$E_x^{2(m)} \geq 0,01 \ M_x^{2(m)},$" and insert -- $E_x^{2(m)} \geq 0.01 M_x^{2(m)},$ --, therefor.

In column 25, line 18, in Claim 18, delete "ore" and insert -- more --, therefor.

In column 26, line 10, in Claim 18, delete "signal:" and insert -- signal; --, therefor.